US012664487B2

(12) United States Patent
Christinzio et al.

(10) Patent No.:  US 12,664,487 B2
(45) Date of Patent:      Jun. 23, 2026

(54) DAMAGE ACCUMULATION METERING FOR REMAINING USEFUL LIFE DETERMINATION

(71) Applicant: U.S. Well Services, LLC, Houston, TX (US)

(72) Inventors: Alexander Christinzio, Houston, TX (US); Arden Albert, Calgary (CA); Jared Oehring, Houston, TX (US)

(73) Assignee: U.S. WELL SERVICES, LLC, Willow Park, TX (US)

( * ) Notice: Subject to any disclaimer, the term of this patent is extended or adjusted under 35 U.S.C. 154(b) by 56 days.

(21) Appl. No.: 16/824,428

(22) Filed: Mar. 19, 2020

(65) Prior Publication Data

US 2020/0300065 A1      Sep. 24, 2020

Related U.S. Application Data

(60) Provisional application No. 62/821,193, filed on Mar. 20, 2019.

(51) Int. Cl.
G06F 11/30          (2006.01)
E21B 43/26          (2006.01)
          (Continued)

(52) U.S. Cl.
CPC ......... G06Q 10/06 (2013.01); E21B 43/2607 (2020.05); G06Q 10/20 (2013.01); G06Q 50/02 (2013.01)

(58) Field of Classification Search
CPC ............................ E21B 41/0092; G06Q 10/06
See application file for complete search history.

(56)          References Cited

U.S. PATENT DOCUMENTS

| | | | |
|---|---|---|---|
| 1,541,601 | A | 6/1925 | Tribe |
| 1,656,861 | A | 1/1928 | Leonard |

(Continued)

FOREIGN PATENT DOCUMENTS

| | | |
|---|---|---|
| CA | 2406801 | 11/2001 |
| CA | 2707269 | 12/2010 |

(Continued)

OTHER PUBLICATIONS

Non-Final Office Action issued in U.S. Appl. No. 16/871,928 mailed Aug. 25, 2021.

(Continued)

*Primary Examiner* — Phuong Huynh
(74) *Attorney, Agent, or Firm* — Abel Schillinger, LLP

(57)          ABSTRACT

A hydraulic fracturing system with damage accumulation monitoring includes a plurality of hydraulic fracturing equipment positioned at a wellsite, including one or more pumps configured to pressurize a fracturing fluid and a distribution system fluidly coupled to receive and consolidate fracturing fluid from the plurality of pumps for injection into a wellhead. The hydraulic fracturing system also includes a damage accumulation monitoring system, including a plurality of sensing devices integrated into respective components of the plurality of hydraulic fracturing equipment, the plurality of sensing devices configured to measure a plurality of usage parameters of the respective components, and a processing device configured to receive the plurality of usage parameters and determine respective damage accumulation measurements of the respective components based at least in part on the usage parameters.

11 Claims, 8 Drawing Sheets

(51) Int. Cl.
    *G06Q 10/06*       (2023.01)
    *G06Q 10/20*       (2023.01)
    *G06Q 50/02*       (2012.01)

(56) References Cited

U.S. PATENT DOCUMENTS

| | | | |
|---|---|---|---|
| 1,671,436 A | 5/1928 | Melott | |
| 1,743,771 A | 1/1930 | Hall | |
| 1,967,466 A | 7/1934 | Damsel | |
| 2,004,077 A | 6/1935 | McCartney | |
| 2,183,364 A | 12/1939 | Bailey | |
| 2,220,622 A | 11/1940 | Aitken | |
| 2,244,106 A | 6/1941 | Granberg | |
| 2,248,051 A | 7/1941 | Armstrong | |
| 2,407,796 A | 9/1946 | Page | |
| 2,416,848 A | 3/1947 | Rothery | |
| 2,610,741 A | 9/1952 | Schmid | |
| 2,753,940 A | 7/1956 | Bonner | |
| 2,976,025 A | 3/1961 | Pro | |
| 3,055,682 A | 9/1962 | Bacher | |
| 3,061,039 A | 10/1962 | Peters | |
| 3,066,503 A | 12/1962 | Fleming | |
| 3,302,069 A | 1/1967 | Webster | |
| 3,334,495 A | 8/1967 | Jensen | |
| 3,347,570 A | 10/1967 | Roessler | |
| 3,722,595 A | 3/1973 | Kiel | |
| 3,764,233 A | 10/1973 | Strickland | |
| 3,773,140 A | 11/1973 | Mahajan | |
| 3,837,179 A | 9/1974 | Barth | |
| 3,849,662 A | 11/1974 | Blaskowski | |
| 3,878,884 A | 4/1975 | Raleigh | |
| 3,881,551 A | 5/1975 | Terry | |
| 3,967,841 A | 7/1976 | Kendrick | |
| 4,037,431 A | 7/1977 | Sugimoto | |
| 4,100,822 A | 7/1978 | Rosman | |
| 4,151,575 A | 4/1979 | Hogue | |
| 4,226,299 A | 10/1980 | Hansen | |
| 4,265,266 A | 5/1981 | Kierbow et al. | |
| 4,411,313 A | 10/1983 | Johnson et al. | |
| 4,432,064 A | 2/1984 | Barker | |
| 4,442,665 A | 4/1984 | Fick | |
| 4,456,092 A | 6/1984 | Kubozuka | |
| 4,506,982 A | 3/1985 | Smithers et al. | |
| 4,512,387 A | 4/1985 | Rodriguez | |
| 4,529,887 A | 7/1985 | Johnson | |
| 4,538,916 A | 9/1985 | Zimmerman | |
| 4,601,629 A | 7/1986 | Zimmerman | |
| 4,676,063 A | 6/1987 | Goebel et al. | |
| 4,759,674 A | 7/1988 | Schroder | |
| 4,768,884 A | 9/1988 | Elkin | |
| 4,783,038 A | 11/1988 | Gilbert | |
| 4,793,386 A | 12/1988 | Sloan | |
| 4,845,981 A | 7/1989 | Pearson | |
| 4,922,463 A | 5/1990 | Del Zotto et al. | |
| 5,004,400 A | 4/1991 | Handke | |
| 5,006,044 A | 4/1991 | Walker, Sr. | |
| 5,025,861 A | 6/1991 | Huber | |
| 5,050,673 A | 9/1991 | Baldridge | |
| 5,114,239 A | 5/1992 | Allen | |
| 5,130,628 A | 7/1992 | Owen | |
| 5,131,472 A | 7/1992 | Dees et al. | |
| 5,172,009 A | 12/1992 | Mohan | |
| 5,189,388 A | 2/1993 | Mosley | |
| 5,230,366 A | 7/1993 | Marandi | |
| 5,293,947 A | 3/1994 | Stratton | |
| 5,334,899 A | 8/1994 | Skybyk | |
| 5,366,324 A | 11/1994 | Arlt | |
| 5,422,550 A | 6/1995 | McClanahan | |
| 5,433,243 A | 7/1995 | Griswold | |
| 5,439,066 A | 8/1995 | Gipson | |
| 5,486,047 A | 1/1996 | Zimmerman | |
| 5,517,822 A | 5/1996 | Haws et al. | |
| 5,548,093 A | 8/1996 | Sato | |
| 5,549,285 A | 8/1996 | Collins | |
| 5,590,976 A | 1/1997 | Kilheffer et al. | |
| 5,606,853 A | 3/1997 | Birch | |
| 5,655,361 A | 8/1997 | Kishi | |
| 5,736,838 A | 4/1998 | Dove et al. | |
| 5,755,096 A | 5/1998 | Holleyman | |
| 5,790,972 A | 8/1998 | Kohlenberger | |
| 5,791,636 A | 8/1998 | Loziuk | |
| 5,798,596 A | 8/1998 | Lordo | |
| 5,813,455 A | 9/1998 | Pratt et al. | |
| 5,865,247 A | 2/1999 | Paterson | |
| 5,879,137 A | 3/1999 | Me | |
| 5,894,888 A | 4/1999 | Wiemers | |
| 5,907,970 A | 6/1999 | Havlovick et al. | |
| 5,950,726 A | 9/1999 | Roberts | |
| 6,035,265 A | 3/2000 | Dister et al. | |
| 6,097,310 A | 8/2000 | Harrell et al. | |
| 6,116,040 A | 9/2000 | Stark | |
| 6,121,705 A | 9/2000 | Hoong | |
| 6,138,764 A | 10/2000 | Scarsdale et al. | |
| 6,142,878 A | 11/2000 | Barin | |
| 6,164,910 A | 12/2000 | Mayleben | |
| 6,202,702 B1 | 3/2001 | Ohira | |
| 6,208,098 B1 | 3/2001 | Kume | |
| 6,254,462 B1 | 7/2001 | Kelton | |
| 6,271,637 B1 | 8/2001 | Kushion | |
| 6,273,193 B1 | 8/2001 | Hermann et al. | |
| 6,315,523 B1 | 11/2001 | Mills | |
| 6,406,011 B1 | 6/2002 | Kosar | |
| 6,442,942 B1 | 9/2002 | Kopko | |
| 6,477,852 B2 | 11/2002 | Dodo | |
| 6,484,490 B1 | 11/2002 | Olsen | |
| 6,491,098 B1 | 12/2002 | Dallas | |
| 6,510,695 B1 | 1/2003 | Fisher | |
| 6,529,135 B1 | 3/2003 | Bowers et al. | |
| 6,585,455 B1 | 7/2003 | Petersen et al. | |
| 6,626,646 B2 | 9/2003 | Rajewski | |
| 6,719,900 B2 | 4/2004 | Hawkins | |
| 6,765,304 B2 | 7/2004 | Baten et al. | |
| 6,776,227 B2 | 8/2004 | Beida | |
| 6,788,022 B2 | 9/2004 | Sopko | |
| 6,802,690 B2 | 10/2004 | Han | |
| 6,808,303 B2 | 10/2004 | Fisher | |
| 6,837,910 B1 | 1/2005 | Yoshikawa | |
| 6,931,310 B2 | 8/2005 | Shimizu et al. | |
| 6,936,947 B1 | 8/2005 | Leijon | |
| 6,985,750 B1 | 1/2006 | Vicknair et al. | |
| 7,082,993 B2 | 8/2006 | Ayoub | |
| 7,104,233 B2 | 9/2006 | Ryczek et al. | |
| 7,170,262 B2 | 1/2007 | Pettigrew | |
| 7,173,399 B2 | 2/2007 | Sihler | |
| 7,279,655 B2 | 10/2007 | Blutke | |
| 7,308,933 B1 | 12/2007 | Mayfield | |
| 7,309,835 B2 | 12/2007 | Morrison | |
| 7,312,593 B1 | 12/2007 | Streicher et al. | |
| 7,336,514 B2 | 2/2008 | Amarillas | |
| 7,341,287 B2 | 3/2008 | Gibb | |
| 7,445,041 B2 | 11/2008 | O'Brien | |
| 7,494,263 B2 | 2/2009 | Dykstra | |
| 7,500,642 B2 | 3/2009 | Cunningham | |
| 7,525,264 B2 | 4/2009 | Dodge | |
| 7,563,076 B2 | 7/2009 | Brunet | |
| 7,581,379 B2 | 9/2009 | Yoshida | |
| 7,675,189 B2 | 3/2010 | Grenier | |
| 7,683,499 B2 | 3/2010 | Saucier | |
| 7,717,193 B2 | 5/2010 | Egilsson | |
| 7,755,310 B2 | 7/2010 | West et al. | |
| 7,770,396 B2 | 8/2010 | Roby | |
| 7,795,830 B2 | 9/2010 | Johnson | |
| 7,807,048 B2 | 10/2010 | Collette | |
| 7,835,140 B2 | 11/2010 | Mori | |
| 7,845,413 B2 | 12/2010 | Shampine | |
| 7,894,757 B2 | 2/2011 | Matsuno | |
| 7,900,893 B2 | 3/2011 | Teurlay | |
| 7,926,562 B2 | 4/2011 | Poitzsch | |
| 7,940,039 B2 | 5/2011 | de Buda | |
| 7,977,824 B2 | 7/2011 | Halen et al. | |
| 7,984,757 B1 | 7/2011 | Keast | |
| 8,037,936 B2 | 10/2011 | Neuroth | |
| 8,054,084 B2 | 11/2011 | Schulz et al. | |
| 8,083,504 B2 | 12/2011 | Williams | |

(56)           References Cited

U.S. PATENT DOCUMENTS

| | | | |
|---|---|---|---|
| 8,091,928 | B2 | 1/2012 | Carrier |
| 8,096,354 | B2 | 1/2012 | Poitzsch |
| 8,096,891 | B2 | 1/2012 | Lochtefeld |
| 8,139,383 | B2 | 3/2012 | Efraimsson |
| 8,146,665 | B2 | 4/2012 | Neal |
| 8,154,419 | B2 | 4/2012 | Daussin et al. |
| 8,221,513 | B2 | 7/2012 | Ariyapadi |
| 8,232,892 | B2 | 7/2012 | Overholt et al. |
| 8,261,528 | B2 | 9/2012 | Chillar |
| 8,272,439 | B2 | 9/2012 | Strickland |
| 8,310,272 | B2 | 11/2012 | Quarto |
| 8,354,817 | B2 | 1/2013 | Yeh et al. |
| 8,474,521 | B2 | 7/2013 | Kajaria |
| RE44,444 | E | 8/2013 | Dole |
| 8,506,267 | B2 | 8/2013 | Gambier et al. |
| 8,534,235 | B2 | 9/2013 | Chandler |
| 8,556,302 | B2 | 10/2013 | Dole |
| 8,573,303 | B2 | 11/2013 | Kerfoot |
| 8,596,056 | B2 | 12/2013 | Woodmansee |
| 8,616,005 | B1 | 12/2013 | Cousino |
| 8,616,274 | B2 | 12/2013 | Belcher |
| 8,646,521 | B2 | 2/2014 | Bowen |
| 8,692,408 | B2 | 4/2014 | Zhang et al. |
| 8,727,068 | B2 | 5/2014 | Bruin |
| 8,760,657 | B2 | 6/2014 | Pope |
| 8,763,387 | B2 | 7/2014 | Schmidt |
| 8,774,972 | B2 | 7/2014 | Rusnak |
| 8,789,601 | B2 | 7/2014 | Broussard |
| 8,795,525 | B2 | 8/2014 | McGinnis et al. |
| 8,800,652 | B2 | 8/2014 | Bartko |
| 8,807,960 | B2 | 8/2014 | Stephenson |
| 8,838,341 | B2 | 9/2014 | Kumano |
| 8,851,860 | B1 | 10/2014 | Mail |
| 8,857,506 | B2 | 10/2014 | Stone, Jr. |
| 8,899,940 | B2 | 12/2014 | Laugemors |
| 8,905,056 | B2 | 12/2014 | Kendrick |
| 8,905,138 | B2 | 12/2014 | Lundstedt et al. |
| 8,997,904 | B2 | 4/2015 | Cryer |
| 9,018,881 | B2 | 4/2015 | Mao et al. |
| 9,051,822 | B2 | 6/2015 | Ayan |
| 9,051,923 | B2 | 6/2015 | Kuo |
| 9,061,223 | B2 | 6/2015 | Winborn |
| 9,062,545 | B2 | 6/2015 | Roberts et al. |
| 9,067,182 | B2 | 6/2015 | Nichols |
| 9,103,193 | B2 | 8/2015 | Coli |
| 9,119,326 | B2 | 8/2015 | McDonnell |
| 9,121,257 | B2 | 9/2015 | Coli et al. |
| 9,140,105 | B2 | 9/2015 | Pattillo |
| 9,140,110 | B2 | 9/2015 | Coli et al. |
| 9,160,168 | B2 | 10/2015 | Chapel |
| 9,260,253 | B2 | 2/2016 | Naizer |
| 9,322,239 | B2 | 4/2016 | Angeles Boza et al. |
| 9,324,049 | B2 | 4/2016 | Thomeer |
| 9,340,353 | B2 | 5/2016 | Oren |
| 9,353,593 | B1 | 5/2016 | Lu et al. |
| 9,366,114 | B2 | 6/2016 | Coli et al. |
| 9,410,410 | B2 | 8/2016 | Broussard |
| 9,450,385 | B2 | 9/2016 | Kristensen |
| 9,475,020 | B2 | 10/2016 | Coli et al. |
| 9,475,021 | B2 | 10/2016 | Coli et al. |
| 9,482,086 | B2 | 11/2016 | Richardson et al. |
| 9,499,335 | B2 | 11/2016 | McIver |
| 9,506,333 | B2 | 11/2016 | Castillo et al. |
| 9,513,055 | B1 | 12/2016 | Seal |
| 9,534,473 | B2 | 1/2017 | Morris |
| 9,562,420 | B2 | 2/2017 | Morris et al. |
| 9,587,649 | B2 | 3/2017 | Oehring |
| 9,611,728 | B2 | 4/2017 | Oehring |
| 9,650,871 | B2 | 5/2017 | Oehring et al. |
| 9,650,879 | B2 | 5/2017 | Broussard et al. |
| 9,706,185 | B2 | 7/2017 | Ellis |
| 9,728,354 | B2 | 8/2017 | Skolozdra |
| 9,738,461 | B2 | 8/2017 | DeGaray |
| 9,739,546 | B2 | 8/2017 | Bertilsson et al. |
| 9,745,840 | B2 | 8/2017 | Oehring |
| 9,790,858 | B2 | 10/2017 | Kanebako |
| 9,840,901 | B2 | 12/2017 | Oehring |
| 9,863,228 | B2 | 1/2018 | Shampine et al. |
| 9,893,500 | B2 | 2/2018 | Oehring |
| 9,903,190 | B2 | 2/2018 | Conrad |
| 9,909,398 | B2 | 3/2018 | Pham |
| 9,915,128 | B2 | 3/2018 | Hunter |
| 9,932,799 | B2 | 4/2018 | Symchuk |
| 9,945,365 | B2 | 4/2018 | Hernandez et al. |
| 9,963,961 | B2 | 5/2018 | Hardin |
| 9,970,278 | B2 | 5/2018 | Broussard |
| 9,976,351 | B2 | 5/2018 | Randall |
| 9,995,218 | B2 | 6/2018 | Oehring |
| 10,008,880 | B2 | 6/2018 | Vicknair |
| 10,020,711 | B2 | 7/2018 | Oehring |
| 10,036,238 | B2 | 7/2018 | Oehring |
| 10,107,086 | B2 | 10/2018 | Dehring |
| 10,119,381 | B2 | 11/2018 | Oehring |
| 10,184,465 | B2 | 1/2019 | Enis et al. |
| 10,196,878 | B2 | 2/2019 | Hunter |
| 10,221,639 | B2 | 3/2019 | Romer et al. |
| 10,227,854 | B2 | 3/2019 | Glass |
| 10,232,332 | B2 | 3/2019 | Oehring |
| 10,246,984 | B2 | 4/2019 | Payne |
| 10,254,732 | B2 | 4/2019 | Oehring |
| 10,260,327 | B2 | 4/2019 | Kajaria |
| 10,280,724 | B2 | 5/2019 | Hinderliter |
| 10,287,873 | B2 | 5/2019 | Filas |
| 10,302,079 | B2 | 5/2019 | Kendrick |
| 10,309,205 | B2 | 6/2019 | Randall |
| 10,337,308 | B2 | 7/2019 | Broussard |
| 10,371,012 | B2 | 8/2019 | Davis |
| 10,378,326 | B2 | 8/2019 | Morris |
| 10,393,108 | B2 | 8/2019 | Chong |
| 10,407,990 | B2 | 9/2019 | Oehring |
| 10,408,030 | B2 | 9/2019 | Oehring |
| 10,408,031 | B2 | 9/2019 | Oehring |
| 10,415,332 | B2 | 9/2019 | Morris et al. |
| 10,436,026 | B2 | 10/2019 | Ounadjela |
| 10,526,882 | B2 | 1/2020 | Oehring |
| 10,627,003 | B2 | 4/2020 | Dale et al. |
| 10,648,270 | B2 | 5/2020 | Brunty et al. |
| 10,648,311 | B2 | 5/2020 | Oehring |
| 10,669,471 | B2 | 6/2020 | Schmidt et al. |
| 10,669,804 | B2 | 6/2020 | Kotrla |
| 10,686,301 | B2 | 6/2020 | Oehring et al. |
| 10,690,131 | B2 | 6/2020 | Rashid |
| 10,695,950 | B2 | 6/2020 | Igo et al. |
| 10,711,576 | B2 | 7/2020 | Bishop |
| 10,731,561 | B2 | 8/2020 | Oehring et al. |
| 10,740,730 | B2 | 8/2020 | Altamirano et al. |
| 10,767,561 | B2 | 9/2020 | Brady |
| 10,781,752 | B2 | 9/2020 | Kikkawa et al. |
| 10,794,165 | B2 | 10/2020 | Fischer et al. |
| 10,895,202 | B1 | 1/2021 | Yeung et al. |
| 10,934,824 | B2 | 3/2021 | Oehring |
| 10,988,998 | B2 | 4/2021 | Fischer et al. |
| 11,015,594 | B2 | 5/2021 | Yeung et al. |
| 11,091,992 | B2 | 8/2021 | Broussard |
| 12,338,772 | B2 | 6/2025 | Yeung et al. |
| 2001/0000996 | A1 | 5/2001 | Grimland et al. |
| 2002/0169523 | A1 | 11/2002 | Ross et al. |
| 2003/0056514 | A1 | 3/2003 | Lohn |
| 2003/0057704 | A1 | 3/2003 | Baten |
| 2003/0079875 | A1 | 5/2003 | Weng |
| 2003/0138327 | A1 | 7/2003 | Jones et al. |
| 2004/0040746 | A1 | 3/2004 | Niedermayr et al. |
| 2004/0045703 | A1 | 3/2004 | Hooper et al. |
| 2004/0102109 | A1 | 5/2004 | Cratty et al. |
| 2004/0167738 | A1 | 8/2004 | Miller |
| 2005/0061548 | A1 | 3/2005 | Hooper |
| 2005/0116541 | A1 | 6/2005 | Seiver |
| 2005/0201197 | A1 | 9/2005 | Duell et al. |
| 2005/0274508 | A1 | 12/2005 | Folk |
| 2006/0052903 | A1 | 3/2006 | Bassett |
| 2006/0065319 | A1 | 3/2006 | Csitari |
| 2006/0109141 | A1 | 5/2006 | Huang |
| 2007/0125544 | A1 | 6/2007 | Robinson |
| 2007/0131410 | A1 | 6/2007 | Hill |

(56) References Cited

U.S. PATENT DOCUMENTS

| | | |
|---|---|---|
| 2007/0187163 A1 | 8/2007 | Cone |
| 2007/0201305 A1 | 8/2007 | Heilman |
| 2007/0226089 A1 | 9/2007 | DeGaray et al. |
| 2007/0277982 A1 | 12/2007 | Shampine |
| 2007/0278140 A1 | 12/2007 | Mallet et al. |
| 2008/0017369 A1 | 1/2008 | Sarada |
| 2008/0041596 A1 | 2/2008 | Blount |
| 2008/0095644 A1 | 4/2008 | Mantei et al. |
| 2008/0112802 A1 | 5/2008 | Orlando |
| 2008/0137266 A1 | 6/2008 | Jensen |
| 2008/0164023 A1 | 7/2008 | Dykstra et al. |
| 2008/0208478 A1 | 8/2008 | Ella et al. |
| 2008/0217024 A1 | 9/2008 | Moore |
| 2008/0236818 A1 | 10/2008 | Dykstra |
| 2008/0257449 A1 | 10/2008 | Weinstein et al. |
| 2008/0264625 A1 | 10/2008 | Ochoa |
| 2008/0264649 A1 | 10/2008 | Crawford |
| 2008/0277120 A1 | 11/2008 | Hickie |
| 2008/0288115 A1 | 11/2008 | Rusnak |
| 2009/0045782 A1 | 2/2009 | Datta |
| 2009/0065299 A1 | 3/2009 | Vito |
| 2009/0068031 A1 | 3/2009 | Gambier |
| 2009/0068301 A1 | 3/2009 | Gambier |
| 2009/0072645 A1 | 3/2009 | Quere |
| 2009/0078410 A1 | 3/2009 | Krenek |
| 2009/0093317 A1 | 4/2009 | Kajiwara et al. |
| 2009/0095482 A1 | 4/2009 | Surjaatmadja |
| 2009/0114392 A1 | 5/2009 | Tolman |
| 2009/0145611 A1 | 6/2009 | Pallini, Jr. |
| 2009/0153354 A1 | 6/2009 | Daussin |
| 2009/0188181 A1 | 7/2009 | Forbis |
| 2009/0200035 A1 | 8/2009 | Bjerkreim et al. |
| 2009/0260826 A1 | 10/2009 | Sherwood |
| 2009/0308602 A1 | 12/2009 | Bruins |
| 2009/0315297 A1 | 12/2009 | Nadeau |
| 2010/0000508 A1 | 1/2010 | Chandler |
| 2010/0019574 A1 | 1/2010 | Baldassarre et al. |
| 2010/0038907 A1 | 2/2010 | Hunt |
| 2010/0045109 A1 | 2/2010 | Arnold |
| 2010/0051272 A1 | 3/2010 | Loree et al. |
| 2010/0132949 A1 | 6/2010 | DeFosse et al. |
| 2010/0146981 A1 | 6/2010 | Motakef |
| 2010/0172202 A1 | 7/2010 | Borgstadt |
| 2010/0193057 A1 | 8/2010 | Garner |
| 2010/0250139 A1 | 9/2010 | Hobbs |
| 2010/0281876 A1 | 11/2010 | Khan |
| 2010/0293973 A1 | 11/2010 | Erickson |
| 2010/0303655 A1 | 12/2010 | Scekic |
| 2010/0322802 A1 | 12/2010 | Kugelev |
| 2011/0005757 A1 | 1/2011 | Hebert |
| 2011/0017468 A1 | 1/2011 | Birch et al. |
| 2011/0052423 A1 | 3/2011 | Gambier et al. |
| 2011/0061855 A1 | 3/2011 | Case |
| 2011/0081268 A1 | 4/2011 | Ochoa et al. |
| 2011/0085924 A1 | 4/2011 | Shampine |
| 2011/0110793 A1 | 5/2011 | Leugemors et al. |
| 2011/0166046 A1 | 7/2011 | Weaver |
| 2011/0175397 A1 | 7/2011 | Amrine |
| 2011/0197988 A1 | 8/2011 | Van Vliet |
| 2011/0241590 A1 | 10/2011 | Horikoshi |
| 2011/0247878 A1 | 10/2011 | Rasheed |
| 2011/0272158 A1 | 11/2011 | Neal |
| 2012/0018016 A1 | 1/2012 | Gibson |
| 2012/0049625 A1 | 3/2012 | Hopwood |
| 2012/0063936 A1 | 3/2012 | Baxter et al. |
| 2012/0085541 A1 | 4/2012 | Love et al. |
| 2012/0112757 A1 | 5/2012 | Vrankovic |
| 2012/0127635 A1 | 5/2012 | Grindeland |
| 2012/0150455 A1 | 6/2012 | Franklin et al. |
| 2012/0152716 A1 | 6/2012 | Kikukawa et al. |
| 2012/0205301 A1 | 8/2012 | McGuire et al. |
| 2012/0205400 A1 | 8/2012 | DeGaray et al. |
| 2012/0222865 A1 | 9/2012 | Larson |
| 2012/0232728 A1 | 9/2012 | Karimi et al. |
| 2012/0247783 A1 | 10/2012 | Berner, Jr. |
| 2012/0255734 A1 | 10/2012 | Coli |
| 2013/0009469 A1 | 1/2013 | Gillett |
| 2013/0025706 A1 | 1/2013 | DeGaray et al. |
| 2013/0051971 A1 | 2/2013 | Wyse et al. |
| 2013/0078114 A1 | 3/2013 | Van Rijswick |
| 2013/0138254 A1 | 5/2013 | Seals |
| 2013/0175038 A1 | 7/2013 | Conrad |
| 2013/0175039 A1 | 7/2013 | Guidry |
| 2013/0180722 A1 | 7/2013 | Olarte Caro et al. |
| 2013/0189629 A1 | 7/2013 | Chandler |
| 2013/0199617 A1 | 8/2013 | DeGaray et al. |
| 2013/0233542 A1 | 9/2013 | Shampine |
| 2013/0255271 A1 | 10/2013 | Yu et al. |
| 2013/0284278 A1 | 10/2013 | Winborn |
| 2013/0284455 A1 | 10/2013 | Kajaria et al. |
| 2013/0299167 A1 | 11/2013 | Fordyce et al. |
| 2013/0306322 A1 | 11/2013 | Sanborn |
| 2013/0317750 A1 | 11/2013 | Hunter |
| 2013/0341029 A1 | 12/2013 | Roberts et al. |
| 2013/0343858 A1 | 12/2013 | Flusche |
| 2014/0000899 A1 | 1/2014 | Nevison |
| 2014/0010671 A1 | 1/2014 | Cryer et al. |
| 2014/0054965 A1 | 2/2014 | Jain |
| 2014/0060658 A1 | 3/2014 | Hains |
| 2014/0077607 A1 | 3/2014 | Clarke |
| 2014/0095114 A1 | 4/2014 | Thomeer |
| 2014/0096974 A1 | 4/2014 | Coli |
| 2014/0124162 A1 | 5/2014 | Leavitt |
| 2014/0138079 A1 | 5/2014 | Broussard |
| 2014/0174717 A1 | 6/2014 | Broussard |
| 2014/0219824 A1 | 8/2014 | Burnette |
| 2014/0238683 A1 | 8/2014 | Korach |
| 2014/0246211 A1 | 9/2014 | Guidry et al. |
| 2014/0251623 A1 | 9/2014 | Lestz et al. |
| 2014/0255214 A1 | 9/2014 | Burnette |
| 2014/0277772 A1 | 9/2014 | Lopez |
| 2014/0290768 A1 | 10/2014 | Randle |
| 2014/0294603 A1 | 10/2014 | Best |
| 2014/0379300 A1 | 12/2014 | Devine |
| 2015/0027712 A1 | 1/2015 | Vicknair |
| 2015/0053426 A1 | 2/2015 | Smith |
| 2015/0068724 A1 | 3/2015 | Coli et al. |
| 2015/0068754 A1 | 3/2015 | Coli et al. |
| 2015/0075778 A1 | 3/2015 | Walters |
| 2015/0083426 A1 | 3/2015 | Lesko |
| 2015/0097504 A1 | 4/2015 | Lamascus |
| 2015/0114652 A1 | 4/2015 | Lestz |
| 2015/0136043 A1 | 5/2015 | Shaaban |
| 2015/0144336 A1 | 5/2015 | Hardin |
| 2015/0147194 A1 | 5/2015 | Foote |
| 2015/0159911 A1 | 6/2015 | Holt |
| 2015/0175013 A1 | 6/2015 | Cryer et al. |
| 2015/0176386 A1 | 6/2015 | Castillo et al. |
| 2015/0211512 A1 | 7/2015 | Wiegman |
| 2015/0211524 A1 | 7/2015 | Broussard |
| 2015/0217672 A1 | 8/2015 | Shampine |
| 2015/0225113 A1 | 8/2015 | Lungu |
| 2015/0233530 A1 | 8/2015 | Sandidge |
| 2015/0252661 A1 | 9/2015 | Glass |
| 2015/0300145 A1 | 10/2015 | Coli et al. |
| 2015/0300336 A1 | 10/2015 | Hernandez |
| 2015/0314225 A1 | 11/2015 | Coli et al. |
| 2015/0330172 A1 | 11/2015 | Allmaras |
| 2015/0354322 A1 | 12/2015 | Vicknair |
| 2016/0006311 A1 | 1/2016 | Li |
| 2016/0032703 A1 | 2/2016 | Broussard et al. |
| 2016/0102537 A1 | 4/2016 | Lopez |
| 2016/0105022 A1 | 4/2016 | Oehring |
| 2016/0160889 A1 | 6/2016 | Hoffman et al. |
| 2016/0177675 A1 | 6/2016 | Morris et al. |
| 2016/0177678 A1 | 6/2016 | Morris |
| 2016/0186531 A1 | 6/2016 | Harkless et al. |
| 2016/0208592 A1 | 7/2016 | Oehring |
| 2016/0208593 A1 | 7/2016 | Coli et al. |
| 2016/0208594 A1 | 7/2016 | Coli et al. |
| 2016/0208595 A1 | 7/2016 | Tang |
| 2016/0221220 A1 | 8/2016 | Paige |
| 2016/0230524 A1 | 8/2016 | Dumoit |
| 2016/0230525 A1 | 8/2016 | Lestz et al. |

(56) References Cited

U.S. PATENT DOCUMENTS

| | | |
|---|---|---|
| 2016/0230660 A1 | 8/2016 | Zeitoun et al. |
| 2016/0258267 A1 | 9/2016 | Payne |
| 2016/0265457 A1 | 9/2016 | Stephenson |
| 2016/0273328 A1 | 9/2016 | Oehring |
| 2016/0273456 A1 | 9/2016 | Zhang et al. |
| 2016/0281484 A1 | 9/2016 | Lestz |
| 2016/0290114 A1 | 10/2016 | Oehring |
| 2016/0290563 A1 | 10/2016 | Diggins |
| 2016/0312108 A1 | 10/2016 | Lestz et al. |
| 2016/0319650 A1 | 11/2016 | Oehring |
| 2016/0326853 A1 | 11/2016 | Fred et al. |
| 2016/0326854 A1 | 11/2016 | Broussard |
| 2016/0326855 A1 | 11/2016 | Coli et al. |
| 2016/0341281 A1 | 11/2016 | Brunvold et al. |
| 2016/0348479 A1 | 12/2016 | Oehring |
| 2016/0349728 A1 | 12/2016 | Oehring |
| 2016/0369609 A1 | 12/2016 | Morris et al. |
| 2017/0016433 A1 | 1/2017 | Chong |
| 2017/0021318 A1 | 1/2017 | McIver et al. |
| 2017/0022788 A1 | 1/2017 | Oehring et al. |
| 2017/0022807 A1 | 1/2017 | Dursun |
| 2017/0028368 A1 | 2/2017 | Oehring et al. |
| 2017/0030177 A1 | 2/2017 | Oehring |
| 2017/0030178 A1 | 2/2017 | Oehring et al. |
| 2017/0036178 A1 | 2/2017 | Coli et al. |
| 2017/0036872 A1 | 2/2017 | Wallace |
| 2017/0037717 A1 | 2/2017 | Oehring |
| 2017/0037718 A1 | 2/2017 | Coli et al. |
| 2017/0043280 A1 | 2/2017 | Vankouwenberg |
| 2017/0051732 A1 | 2/2017 | Hemandez et al. |
| 2017/0074076 A1 | 3/2017 | Joseph et al. |
| 2017/0082033 A1 | 3/2017 | Wu et al. |
| 2017/0096885 A1* | 4/2017 | Oehring ............... E21B 43/267 |
| 2017/0096889 A1 | 4/2017 | Blanckaert et al. |
| 2017/0104389 A1 | 4/2017 | Morris et al. |
| 2017/0114625 A1 | 4/2017 | Norris |
| 2017/0130743 A1 | 5/2017 | Anderson |
| 2017/0138171 A1 | 5/2017 | Richards et al. |
| 2017/0145918 A1 | 5/2017 | Oehring |
| 2017/0146189 A1 | 5/2017 | Herman |
| 2017/0159570 A1 | 6/2017 | Bickert |
| 2017/0159654 A1 | 6/2017 | Kendrick |
| 2017/0175516 A1* | 6/2017 | Eslinger ............. F04D 15/0066 |
| 2017/0204852 A1 | 7/2017 | Barnett |
| 2017/0212535 A1 | 7/2017 | Shelman et al. |
| 2017/0218727 A1 | 8/2017 | Oehring |
| 2017/0218843 A1 | 8/2017 | Oehring |
| 2017/0222409 A1 | 8/2017 | Oehring |
| 2017/0226838 A1 | 8/2017 | Ceizobka et al. |
| 2017/0226839 A1 | 8/2017 | Broussard |
| 2017/0226842 A1* | 8/2017 | Omont ................... G06Q 50/02 |
| 2017/0234250 A1 | 8/2017 | Janik |
| 2017/0241221 A1 | 8/2017 | Seshadri |
| 2017/0259227 A1 | 9/2017 | Morris et al. |
| 2017/0292513 A1 | 10/2017 | Haddad |
| 2017/0313499 A1 | 11/2017 | Hughes et al. |
| 2017/0314380 A1 | 11/2017 | Oehring |
| 2017/0314979 A1 | 11/2017 | Ye |
| 2017/0328179 A1 | 11/2017 | Dykstra |
| 2017/0369258 A1 | 12/2017 | DeGaray |
| 2017/0370639 A1 | 12/2017 | Barden et al. |
| 2018/0028992 A1 | 2/2018 | Stegemoeller |
| 2018/0038216 A1 | 2/2018 | Zhang |
| 2018/0045331 A1 | 2/2018 | Lopez |
| 2018/0090914 A1 | 3/2018 | Johnson et al. |
| 2018/0156210 A1 | 6/2018 | Oehring |
| 2018/0181830 A1 | 6/2018 | Aharuka et al. |
| 2018/0183219 A1 | 6/2018 | Oehring |
| 2018/0216455 A1 | 8/2018 | Andreychuk |
| 2018/0238147 A1 | 8/2018 | Shahri |
| 2018/0245428 A1 | 8/2018 | Richards |
| 2018/0258746 A1 | 9/2018 | Broussard |
| 2018/0259080 A1 | 9/2018 | Dale et al. |
| 2018/0266217 A1 | 9/2018 | Funkhauser et al. |
| 2018/0266412 A1 | 9/2018 | Stokkevag |
| 2018/0274446 A1 | 9/2018 | Oehring |
| 2018/0284817 A1 | 10/2018 | Cook et al. |
| 2018/0291713 A1 | 10/2018 | Jeanson |
| 2018/0298731 A1 | 10/2018 | Bishop |
| 2018/0312738 A1 | 11/2018 | Rutsch et al. |
| 2018/0313677 A1 | 11/2018 | Warren et al. |
| 2018/0320483 A1 | 11/2018 | Zhang |
| 2018/0343125 A1 | 11/2018 | Clish |
| 2018/0363437 A1 | 12/2018 | Coli |
| 2018/0363640 A1 | 12/2018 | Kajita et al. |
| 2018/0366950 A1 | 12/2018 | Pedersen et al. |
| 2019/0003329 A1 | 1/2019 | Morris |
| 2019/0010793 A1 | 1/2019 | Hinderliter |
| 2019/0040727 A1 | 2/2019 | Oehring et al. |
| 2019/0063309 A1 | 2/2019 | Davis |
| 2019/0100989 A1 | 4/2019 | Stewart |
| 2019/0112910 A1 | 4/2019 | Oehring |
| 2019/0119096 A1 | 4/2019 | Haile |
| 2019/0120024 A1 | 4/2019 | Oehring |
| 2019/0128080 A1 | 5/2019 | Ross |
| 2019/0128104 A1 | 5/2019 | Graham et al. |
| 2019/0145251 A1 | 5/2019 | Johnson |
| 2019/0154020 A1 | 5/2019 | Glass |
| 2019/0162061 A1 | 5/2019 | Stepheson |
| 2019/0169971 A1 | 6/2019 | Oehring |
| 2019/0178057 A1 | 6/2019 | Hunter |
| 2019/0178235 A1 | 6/2019 | Coskrey |
| 2019/0203567 A1 | 7/2019 | Ross |
| 2019/0203572 A1 | 7/2019 | Morris |
| 2019/0211661 A1 | 7/2019 | Reckels |
| 2019/0226317 A1 | 7/2019 | Payne |
| 2019/0245348 A1 | 8/2019 | Hinderliter |
| 2019/0249527 A1 | 8/2019 | Kraynek |
| 2019/0257462 A1 | 8/2019 | Rogers |
| 2019/0292866 A1 | 9/2019 | Ross |
| 2019/0292891 A1 | 9/2019 | Kajaria |
| 2019/0316447 A1 | 10/2019 | Oehring |
| 2020/0040878 A1 | 2/2020 | Morris |
| 2020/0047141 A1 | 2/2020 | Oehring et al. |
| 2020/0088152 A1 | 3/2020 | Allion et al. |
| 2020/0232454 A1 | 7/2020 | Chretien |
| 2020/0325760 A1 | 10/2020 | Markham |
| 2020/0350790 A1 | 11/2020 | Luft et al. |

FOREIGN PATENT DOCUMENTS

| | | |
|---|---|---|
| CA | 2482943 | 5/2011 |
| CA | 3050131 | 11/2011 |
| CA | 2955706 | 10/2012 |
| CA | 2966672 | 10/2012 |
| CA | 3000322 | 4/2013 |
| CA | 2787814 | 2/2014 |
| CA | 2833711 | 5/2014 |
| CA | 2978706 | 9/2016 |
| CA | 2944980 | 2/2017 |
| CA | 3006422 | 6/2017 |
| CA | 3018485 | 8/2017 |
| CA | 2964593 | 10/2017 |
| CA | 2849825 | 7/2018 |
| CA | 3067854 A1 | 1/2019 |
| CA | 2919649 | 2/2019 |
| CA | 2919666 | 7/2019 |
| CA | 2797081 | 9/2019 |
| CA | 2945579 | 10/2019 |
| CN | 101977016 | 2/2011 |
| CN | 104117308 A | 10/2014 |
| CN | 104196613 A | 12/2014 |
| CN | 205986303 U | 2/2017 |
| CN | 108049999 A | 5/2018 |
| CN | 110118075 A | 8/2019 |
| CN | 112196508 A | 1/2021 |
| JP | 2004264589 | 9/2004 |
| WO | 00/47893 | 8/2000 |
| WO | 2009046280 | 4/2009 |
| WO | 2012/051705 | 4/2012 |
| WO | 2014/116761 | 7/2014 |
| WO | 2014/177346 | 11/2014 |
| WO | 2016/144939 | 9/2016 |
| WO | 2016/160458 | 10/2016 |

(56) References Cited

FOREIGN PATENT DOCUMENTS

WO          2018044307 A1      3/2018
WO          2018213925 A1      11/2018
WO          2019210417         11/2019

OTHER PUBLICATIONS

Non-Final Office Action issued in U.S. Appl. No. 16/943,727 mailed Aug. 3, 2021.
Non-Final Office Action issued in U.S. Appl. No. 14/881,525 mailed Jul. 21, 2021.
Non-Final Office Action issued in U.S. Appl. No. 16/404,283 mailed Jul. 21, 2021.
Notice of Allowance and Notice of Allowability issued in U.S. Appl. No. 15/829,419 mailed Jul. 26, 2021.
Woodbury et al., "Electrical Design Considerations for Drilling Rigs," IEEE Transactions on Industry Applications, vol. 1A-12, No. 4, Jul./Aug. 1976, pp. 421-431.
Canadian Office Action mailed Aug. 17, 2020 in related CA Patent Application No. 2,944,968.
International Search Report and Written Opinion mailed Jun. 23, 2020 in corresponding PCT Application No. PCT/US20/23912.
International Search Report and Written Opinion mailed Jul. 22, 2020 in corresponding PCT Application No. PCT/US20/00017.
Office Action mailed Aug. 4, 2020 in related U.S. Appl. No. 16/385,070.
Office Action mailed Jun. 29, 2020 in related U.S. Appl. No. 16/404,283.
Office Action mailed Jun. 29, 2020 in related U.S. Appl. No. 16/728,359.
Office Action mailed Jun. 22, 2020 in related U.S. Appl. No. 16/377,861.
Canadian Office Action mailed Aug. 18, 2020 in related CA Patent Application No. 2,933,444.
Morris et al., U.S. Appl. No. 62/526,869; Hydration-Blender Transport and Electric Power Distribution for Fracturing Operation; Jun. 28, 2018; USPTO; see entire document.
Final Office Action mailed Feb. 4, 2021 in U.S. Appl. No. 16/597,014.
International Search Report and Written Opinion mailed Feb. 4, 2021 in PCT/US20/59834.
International Search Report and Written Opinion mailed Feb. 2, 2021 in PCT/US20/58906.
International Search Report and Written Opinion mailed Feb. 3, 2021 in PCT/US20/58899.
Non-Final Office Action mailed Jan. 29, 2021 in US 16/564, 185.
Final Office Action mailed Jan. 21, 2021 in U.S. Appl. No. 16/458,696.
Final Office Action mailed Jan. 11, 2021 in U.S. Appl. No. 16/404,283.
Non-Final Office Action mailed Jan. 4, 2021 in U.S. Appl. No. 16/522,043.
International Search Report and Written Opinion mailed Dec. 14, 2020 in PCT/US2020/53980.
Non-Final Office Mailed Oct. 26, 2020 in U.S. Appl. No. 15/356,436.
Non-Final Office Mailed Oct. 5, 2020 in U.S. Appl. No. 16/443,273.
Non-Final Office Action Mailed Sep. 29, 2020 in U.S. Appl. No. 16/943,727.
Non-Final Office Action Mailed Sep. 2, 2020 in U.S. Appl. No. 16/356,263.
Non-Final Office Action Mailed Aug. 31, 2020 in U.S. Appl. No. 16/167,083.
Albone, "Mobile Compressor Stations for Natural Gas Transmission Service," ASME 67-GT-33, Turbo Expo, Power for Land, Sea and Air, vol. 79887, p. 1-10, 1967.
Canadian Office Action issued Sep. 22, 2020 in Canadian Application No. 2,982,974.
International Search Report and Written Opinion Mailed Sep. 3, 2020 in PCT/US2020/36932.
"Process Burner" (https://www.cebasrt.com/productsloii-gaslprocess-bumer) 06 Sep. 6, 2018 (Sep. 6, 2018), entire document, especially para (Burners for refinery Heaters].

Water and Glycol Heating Systems• (https://www.heat-inc.com/wg-series-water-glycol-systems/) Jun. 18, 2018 (Jun. 18, 2018), entire document, especially WG Series Water Glycol Systems.
"Heat Exchanger" (https://en.wikipedia.org/w/index.php?title=Heat_exchanger&oldid=89300146) Apr. 12-18-19, 2019 (Apr. 18, 2019), entire document, especially para (0001].
Canadian Office Action issued Sep. 8, 2020 in Canadian Patent Application No. 2,928,707.
Canadian Office Action issued Aug. 31, 2020 in Canadian Patent Application No. 2,944,980.
International Search Report and Written Opinion Mailed Aug. 28, 2020 in PCT/US20/23821.
Kroposki et al., Making Microgrids Work, 6 IEEE Power and Energy Mag. 40, 41 (2008).
Dan T. Ton & Merrill A. Smith, The U.S. Department of Energy's Microgrid Initiative, 25 The Electricity J. 84 (2012), pp. 84-94.
Non-Final Office Action issued in U.S. Appl. No. 16/871,328 mailed Dec. 9, 2021.
Non-Final Office Action issued in U.S. Appl. No. 16/943,935 mailed Oct. 21, 2021.
Non-Final Office Action issued in U.S. Appl. No. 16/564,186, mailed Oct. 15, 2021.
Final Office Action issued in U.S. Appl. No. 16/356,263 mailed Oct. 7, 2021.
Non-Final Office Action issued in U.S. Appl. No. 17/060,647 mailed Sep. 20, 2021.
Non-Final Office Action issued in U.S. Appl. No. 16/901,774 mailed Sep. 14, 2021.
Canadian Office Action issued in Canadian Application No. 3,094,768 mailed Oct. 28, 2021.
Non-Final Office Action issued in U.S. Appl. No. 14/881,535 mailed May 20, 2020.
Non-Final Office Action issued in U.S. Appl. No. 15/145,443 mailed May 8, 2020.
Non-Final Office Action issued in U.S. Appl. No. 16/458,696 mailed May 22, 2020.
International Search Report and Written Opinion issued in PCT/US2020/023809 mailed Jun. 2, 2020.
Karin, "Duel Fuel Diesel Engines," (2015), Taylor & Francis, pp. 62-63, Retrieved from https://app.knovel.com/hotlink/toc/id:kpDFDE0001/dual-fueal-diesel-engines/duel-fuel-diesel-engines (Year 2015).
Goodwin, "High-voltage auxilliary switchgear for power stations," Power Engineering Journal, 1989, 10 pg. (Year 1989).
International Search Report and Written Opinion mailed Jan. 2, 2020 in related PCT Application No. PCT/US19/55325.
Notice of Allowance mailed Jan. 9, 2020 in related U.S. Appl. No. 16/570,331.
Non-Final Office Action mailed Dec. 23, 2019 in related U.S. Appl. No. 16/597,008.
Non-Final Office Action mailed Mar. 3, 2020 in related U.S. Appl. No. 16/152,695.
Non-Final Office Action mailed Dec. 6, 2019 in related U.S. Appl. No. 16/564,186.
International Search Report and Written Opinion mailed Nov. 26, 2019 in related PCT Application No. PCT/US19/51018.
International Search Report and Written Opinion mailed Feb. 11, 2020 in related PCT Application No. PCT/US2019/055323.
Final Office Action mailed Mar. 31, 2020 in related U.S. Appl. No. 15/356,436.
JK Power Networks—Transformers to Supply Heat to Tate Modern—from Press Releases May 16, 2013.
Non-Final Office Action issued in corresponding U.S. Appl. No. 15/293,681 dated Feb. 16, 2017.
Non-Final Office Action issued in corresponding U.S. Appl. No. 15/294,349 dated Mar. 14, 2017.
Final Office Action issued in corresponding U.S. Appl. No. 15/145,491 dated Jan. 20, 2017.
Non-Final Office Action issued in corresponding U.S. Appl. No. 15/145,443 dated Feb. 7, 2017.
Notice of Allowance issued in corresponding U.S. Appl. No. 15/217,040 dated Mar. 28, 2017.

(56)            References Cited

OTHER PUBLICATIONS

Notice of Allowance issued in corresponding U.S. Appl. No. 14/622,532 dated Mar. 27, 2017.
Non-Final Office Action issued in corresponding U.S. Appl. No. 15/291,842 dated Jan. 6, 2017.
Final Office Action issued in corresponding U.S. Appl. No. 14/622,532 dated Dec. 7, 2016.
Non-Final Office Action issued in corresponding U.S. Appl. No. 14/622,532 dated May 17, 2016.
Final Office Action issued in corresponding U.S. Appl. No. 14/622,532 dated Dec. 21, 2015.
Non-Final Office Action issued in corresponding U.S. Appl. No. 14/622,532 dated Aug. 5, 2015.
Non-Final Office Action issued in corresponding U.S. Appl. No. 15/145,491 on Sep. 12, 2016.
Non-Final Office Action issued in corresponding U.S. Appl. No. 15/217,040 dated Nov. 29, 2016.
Non-Final Office Action issued in corresponding U.S. Appl. No. 15/235,788 dated Dec. 14, 2016.
Non-Final Office Action issued in corresponding U.S. Appl. No. 15/145,491 dated May 15, 2017.
Non-Final Office Action issued in corresponding U.S. Appl. No. 15/486,970 dated Jun. 22, 2017.
Non-Final Office Action issued in corresponding U.S. Appl. No. 15/487,656 dated Jun. 23, 2017.
Non-Final Office Action issued in corresponding U.S. Appl. No. 15/487,694 dated Jun. 26, 2017.
Final Office Action issued in corresponding U.S. Appl. No. 15/294,349 dated Jul. 6, 2017.
Non-Final Office Action issued in corresponding U.S. Appl. No. 14/884,363 dated Sep. 5, 2017.
Final Office Action issued in corresponding U.S. Appl. No. 15/145,491 dated Sep. 6, 2017.
Non-Final Office Action issued in corresponding U.S. Appl. No. 14/881,535 dated Oct. 6, 2017.
Non-Final Office Action issued in corresponding U.S. Appl. No. 15/145,414 dated Nov. 29, 2017.
Non-Final Office Action issued in corresponding U.S. Appl. No. 15/644,487 dated Nov. 13, 2017.
Canadian Office Action dated Mar. 2, 2018 in related Canadian Patent Application No. 2,833,711.
Office Action dated Apr. 10, 2018 in related U.S. Appl. No. 15/294,349.
Office Action dated Apr. 2, 2018 in related U.S. Appl. No. 15/183,387.
Office Action dated May 29, 2018 in related U.S. Appl. No. 15/235,716.
Candian Office Action dated Apr. 18, 2018 in related Canadian Patent Application No. 2,928,711.
Canadian Office Action dated Jun. 22, 2018 in related Canadian Patent Application No. 2,886,697.
Office Action dated Jul. 25, 2018 in related U.S. Appl. No. 15/644,487.
Office Action dated Oct. 4, 2018 in related U.S. Appl. No. 15/217,081.
International Search Report and Written Opinion dated Sep. 19, 2018 in related PCT Patent Application No. PCT/US2018/040683.
Canadian Office Action dated Sep. 28, 2018 in related Canadian Patent Application No. 2,945,281.
Office Action dated Dec. 12, 2018 in related U.S. Appl. No. 16/160,708.
International Search Report and Written Opinion dated Jan. 2, 2019 in related PCT Patent Application No. PCT/US18/54542.
International Search Report and Written Opinion dated Jan. 2, 2019 in related PCT Patent Application No. PCT/US18/54548.
International Search Report and Written Opinion dated Dec. 31, 2018 in related PCT Patent Application No. PCT/US18/55913.
International Search Report and Written Opinion dated Jan. 4, 2019 in related PCT Patent Application No. PCT/US18/57539.
Non-Final Office Action issued Feb. 12, 2019 in related U.S. Appl. No. 16/170,695.
International Search Report and Written Opinion dated Feb. 15, 2019 in related PCT Patent Application No. PCT/US18/63977.

International Search Report and Written Opinion dated Mar. 5, 2019 in related PCT Patent Application No. PCT/US18/63970.
Non-Final Office Action issued Feb. 25, 2019 in related U.S. Appl. No. 16/210,749.
Non-Final Office Action issued Mar. 6, 2019 in related U.S. Appl. No. 15/183,387.
Office Action mailed Jan. 30, 2019 in related Canadian Patent Application No. 2,936,997.
Office Action mailed Mar. 1, 2019 in related Canadian Patent Application No. 2,943,275.
International Search Report and Written Opinion mailed Apr. 10, 2019 in corresponding PCT Application No. PCT/US2019/016635.
Notice of Allowance mailed Apr. 23, 2019 in corresponding U.S. Appl. No. 15/635,028.
International Search Report and Written Opinion mailed Jul. 9, 2019 in corresponding PCT Application No. PCT/US2019/027584.
Non-Final Office Action issued in corresponding U.S. Appl. No. 16/170,695 dated Jun. 7, 2019.
Non-Final Office Action issued in corresponding U.S. Appl. No. 16/268,030 dated May 10, 2019.
Final Office Action issued in corresponding U.S. Appl. No. 16/210,749 dated Jun. 11, 2019.
Canadian Office Action mailed May 30, 2019 in corresponding CA Application No. 2,833,711.
Canadian Office Action mailed Jun. 20, 2019 in corresponding CA Application No. 2,964,597.
International Search Report and Written Opinion mailed Jul. 9, 2019 in related PCT Application No. PCT/US2019/027584.
Office Action mailed Jun. 7, 2019 in related U.S. Appl. No. 16/268,030.
International Search Report and Written Opinion mailed Sep. 11, 2019 in related PCT Application No. PCT/US2019/037493.
Office Action mailed Aug. 19, 2019 in related U.S. Appl. No. 15/356,436.
Office Action mailed Oct. 2, 2019 in related U.S. Appl. No. 16/152,732.
Office Action mailed Sep. 11, 2019 in related U.S. Appl. No. 16/268,030.
Office Action mailed Oct. 11, 2019 in related U.S. Appl. No. 16/385,070.
Office Action mailed Sep. 3, 2019 in related U.S. Appl. No. 15/994,772.
Office Action mailed Sep. 20, 2019 in related U.S. Appl. No. 16/443,273.
Canadian Office Action mailed Oct. 1, 2019 in related Canadian Patent Application No. 2,936,997.
Office Action mailed Dec. 6, 2019 in related U.S. Appl. No. 16/564,186.
International Search Report and Written Opinion mailed in PCT/US20/67526 mailed May 6, 2021.
International Search Report and Written Opinion mailed in PCT/US20/67608 mailed Mar. 30, 2021.
International Search Report and Written Opinion mailed in PCT/US20/67528 mailed Mar. 19, 2021.
International Search Report and Written Opinion mailed in PCT/US20/67146 mailed Mar. 29, 2021.
International Search Report and Written Opinion mailed in PCT/US20/67523 mailed Mar. 22, 2021.
International Search Report and Written Opinion mailed in PCT/US2020/066543 mailed May 11, 2021.
"VZ Environmental Award of Excellence in Environmental Stewardship, Rocky Mountain 2016—Awarded to: U.S. Well Services, LLC," Oil & Gas Awards, 2016, https://www.oilandgasawards.com/winner/rocky-mountain-2016-vz-environmental-award-for-excellence-in-environmental-stewardship, accessed Aug. 23, 2021, 4 pages.
Austin H. Bonnett, "Root Cause Failure Analysis for AC Induction Motors in the Petroleum and Chemical Industry," 2010, IEEE, Paper No. PCIC-2010-43, 13 pages.
Carolyn Davis, "Natural Gas Finding Niche in E-Fracking, But Diesel Still Rules, " Sep. 6, 2019, Natural Gas Intel, https://www.naturalgasintel.com/natural-gas-finding-niche-in-e-fracking-but-diesel-still-rules, 9 pages.

(56)                References Cited

OTHER PUBLICATIONS

Tim Rahill and Michael C. Fousha, "Sorting Out the Overlap," Jan./Feb. 2009, IEEE Industry Applications Magazine, 12 pages.
Jodi Shafto, "Growth in electric-fracking fleets stunted by tight producer budgets," Aug. 6, 2019, S&P Global Market Intelligence, https://wwww.spglobal.com/marketintelligence/en/news-insights/latest-news-headlines/growth-in-electric-fracking-fleets-stunted-by-tight-producer-budgets, accessed Sep. 16, 2021, 4 pages.
A. H. Bonnett et al., "Squirrel Cage Rotor Options for A.C. Induction Motors," IEEE, accessed May 18, 2021, 4 pages.
U.S. Well Services Investor and Analyst Update: Second Quarter 2021 in Review, 2021, 7 pages.
Standing Order Governing Proceedings—Patent Cases, in the United States District Court for the Western District of Texas, Waco Division, filed Nov. 17, 2021, 11 pages.
U.S. Well Services—Services, http://uswellservices.com/services/, accessed Nov. 13, 2021, 10 pages.
Elsevier, "Variable Speed Pumping—A Guide to Successful Applications," 2019, 186 pages.
*U.S. Well Services, Inc., and U.S. Well Services, LLC* v *Halliburton Company, Cimarex Energy Co., Halliburton Energy Services, Inc., and Halliburton US Techologies, Inc.,* Case No. WA:21-CV-00367-ADA, Document 61, Order Setting Markman Hearing, Nov. 29, 2021, 1 page.
*U.S. Well Services, Inc., and U.S. Well Services, LLC* v *Halliburton Company, Cimarex Energy Co., Halliburton Energy Services, Inc., and Halliburton US Techologies, Inc.,* Case No. WA:21-CV-00367-ADA, Document 61, Order Resetting Markman Hearing, Dec. 8, 2021, 1 page.
Affidavit of Duncan Hall, Internet Archives on Jun. 7, 2021, https://web.archive.org/web/20120917102614/http:/www.quincieoilfield.com/pdf/3.0%20Gardner%20Denver/2500/GD2500Q%200p%20&%20Service%20Manual.pdf, 76 pages.
*U.S. Well Services, LLC* v *Tops Well Services, LLC and Honghua America, LLC,* Case No. 3:19-cv-00237, Document 72-9, Declaration of Dr. Robert Schaaf, Apr. 24, 2020, 52 pages.
*U.S. Well Services, LLC* v *Tops Well Services, LLC and Honghua America, LLC,* Case No. 3:19-cv-00237 Document 72-9, Declaration of Dr. Robert Schaaf—part 2, Apr. 24, 2020, 128 pages.
*U.S. Well Services, LLC* v *Tops Well Services, LLC and Honghua America, LLC,* Case No. 3:19-cv-00237, Document 72-9, Declaration of Dr. Robert Schaaf—part 3, Apr. 24, 2020, 47 pages.
*U.S. Well Services, LLC* v *Tops Well Services, LLC and Honghua America, LLC,* Case No. 3:19-cv-00237, Document 72, Plaintiff's Opening Claim Construction Brief, Apr. 24, 2020, 37 pages.
*U.S. Well Services, LLC* v *Tops Well Services, LLC and Honghua America, LLC,* Case No. 3:19-cv-00237, Document 1, Plaintiff's Original Complaint, 63 pages.
*U.S. Well Services, LLC* v *Tops Well Services, LLC and Honghua America, LLC,* Case No. 3:19-cv-00237, Document 90, Plaintiff's Opposition to Defendants' Motion for Summary Judgment of Invalidity under 35 USC 112, 30 pages.
*U.S. Well Services, LLC* v *Tops Well Services, LLC and Honghua America, LLC,* Case No. 3:19-cv-00237, Document 116, Hearing on Markman and Summary Judgment via Video Conference before the Honorable Andrew M. Edison Day 1 of 1 Day—Transcript, Jun. 15, 2020, 308 pages.
*Kirsch Research and Development, LLC* v *Tarco Specialty Products, Inc.,* Case No. 6:20-cv-00318-ADA, Document 62, Memorandum Opinion and Order Granting Defendant's Opposed Motion to Stay Pending Inter Partes Review of the '482 Patent [ECF No. 57], Oct. 4, 2021, 6 pages.
*Ledcomm LLC* v *Signfiy North America Corp., Signify Holding B.V., and Signify N.V.,* Case No. 6:20-cv-01056-ADA, Document 24, Scheduling Order, Aug. 13, 2021, 4 pages.
Transcend Shipping Systems, LLC and Hapag-Lloyd AG and Hapag-Lloyd (America) LLC, CMA CGM (America) LLC and CMA CGM S.A., Mediterranean Shipping Company S.A., Case Nos. 6:20-cv-1195-ADA, 6:21-cv-0018-ADA, and 6:21-cv-0040-ADA, Document 19, Proposed Amended Scheduling Order, Aug. 13, 2021, 6 pages.
*U.S. Well Services, Inc. and U.S. Well Services, LLC* v *Halliburton Company and Cimarex Energy Co.,* Case No. 6:21-cv-00367-ADA, Document 51, Agreed Scheduling Order, Sep. 16, 2021, 5 pages.
*U.S. Well Services, Inc. and U.S. Well Services, LLC* v *Halliburton Company and Cimarex Energy Co.,* Case No. 6:21-cv-00367-ADA, Plaintiff's Disclosure of Asserted Claims and Preliminary Infringement Contentions, Jul. 12, 2021, 9 pages.
*U.S. Well Services, Inc. and U.S. Well Services, LLC* v *Halliburton Company and Cimarex Energy Co.,* Case No. 6:21-cv-00367-ADA, Plaintiff U.S. Well Services, LLC's Disclosure of Extrinsic Evidence, Oct. 19, 2021, 10 pages.
*U.S. Well Services, Inc. and U.S. Well Services, LLC* v *Halliburton Company and Cimarex Energy Co.,* Case No. 6:21-cv-00367-ADA, Defendants' Preliminary Invalidity Contentions, Sep. 10, 2021, 193 pages.
*U.S. Well Services, Inc. and U.S. Well Services, LLC* v *Halliburton Company and Cimarex Energy Co.,* Case No. 6:21-cv-00367-ADA, Document 1-8, Exhibit H, Halliburton—All Electric Fracturing Reducing Emissions and Cost, Apr. 15, 2021, 6 pages.
Bill Lockley and Barry Wood, "What do the API Motor/Generator Features Cost and What Do They Buy You?" 2010 EEE, Paper No. PCIC-2010-22, 10 pages.
American Petroleum Institute, "Form-wound Squirrel-Cage Induction Motors—500 Horsepower and Larger," Jun. 2004, Fourth Edition, ANSI/API Standard 541-2003, 88 pages.
Assignment record of U.S. Pat. No. 9,366,114, accessed Aug. 19, 2021, 2 pages.
ASTM International, "Standard Specification for Steel Bars, Carbon and Alloy, Hot-Wrought, General Requirements" Oct. 13, 2006, 16 pages.
"U.S. Well Services Issues $125.5 Million Convertible Senior Secured PIK Notes, Executes License Agreement with ProFrac Manufacturing, LLC and Finalizes Amendment to Senior Secured Term Loan," Jun. 28, 2021, https://finance.yahoo.com/news/u-well-services-issues-125-203000637.html?guccounter=1, 6 pages.
Declaration of Joel N. Broussard, Case Nos. IPR2021-01032 & IPR2021-01033, Oct. 13, 2021, 9 pages.
Declaration of Dr. Robert Durham, Case Nos. IPR2021-01033, IPR2021-01032 and IPR2021-01034, Jun. 18, 2021, 179 pages.
Declaration of Robert Schaaf, Case Nos. IPR2021-01032 and IPR2021-01033, Oct. 12, 2021, 45 pages.
Declaration of Sylvia D. Hall-Ellis, Ph.D., Case Nos. IPR2021-01032, IPR2021-01033, and IPR2021-01034, Jun. 18, 2021, 173 pages.
Stephen Cary et al, "Electric Rotating Machine Standards Part II: Magnetic Wedge Design & Monitoring Methods," 2011 IEEE, Paper No. PCIC-2011-41, 8 pages.
Janice Hoppe-Spiers, "Deploying Change," Energy & Mining International, Spring 2017, http://www.emi-magazine.com, 5 pages.
Jim Harris, "U.S. Well Services LLC—Energy and Mining Magazine," Energy & Mining International, Oct. 12, 2021, https://www.emi-magazine.com/sections/profiles/1221-us-well-services-llc, 3 pages.
"Clean Fleet Reduces Emissions by 99% at Hydraulic Fracturing Sites," Fluid Power Journal, https://fluidpowerjournal.com/clean-fleet-reduces-emissions/, accessed Sep. 22, 2021, 5 pages.
Gardner Denver, Well Servicing Pump Model GD-2500Q Quintuplex—Operating and Service Manual, Aug. 2005, 46 pages.
"Halliburton Delivers Successful Grid-Powered Frac Operation," https://www.halliburton.com/en/about-us/press-release/halliburton-delivers-first-successful-grid-powered-fracturing-operation, accessed Sep. 27, 2021, 4 pages.
Hart Energy, Hydraulic Fracturing Techbook, 2015, 99 pages.
R. Mistry et al., "Induction Motor Vibrations in view of the API 541—4th Edition," IEEE, accessed Jun. 10, 2021, 10 pages.
"Game-changing hydraulic fracturing technology, reduces emissions by 99%," Intrado Globe News Wire, Oct. 1, 2014, https://www.globenewswire.com/fr/news-release-2014/10/01/670029/10100696/en/Game-changing-hydraulic-fracturing-technology-reduces-emissions-by-99.html, 4 pages.

(56)            References Cited

OTHER PUBLICATIONS

M. Hodowanec et al., "Introduction to API Standard 541, 4th Edition—Form-Wound Squirrel Cage Induction Motors—Larger than 500 Horsepower," 2003, IEEE, Paper No. PCIC-2003-33, 9 pages.

D. Bogh et al., "A User's Guide to Factory Testing of Large Motors: What Should Your Witness Expect," IEEE, accessed Jun. 10, 2021, 8 pages.

Ryan Davis, "Albright Says He'll Very Rarely Put Cases on Hold for PTAB," Law 360, https://www.law360.com/articles/1381597/print? section=ip, 2 pages.

Dani Kass, "Fintiv Fails: PTAB Uses 'Remarkably Inaccurate' Trial Dates," Nov. 2, 2021, Law 360, 1 page.

Eugene A. Avallone et al., "Marks' Standard Handbook for Mechanical Engineers, 11th Edition," 2007, pp. 3-65, 14-2, 14-3, 14-13, 14-14, 20-91, 22-12, 22-13, 22-14, 22-15, 22-16, 10-3, 20-21, 20-22, 20-85, 20-86, 20-89, and 20-90.

T. W. Pascall et al., "Navigating the Test Requirements of API 541 4th Edition," 2007, IEEE, Paper No. PCIC-2007-11, 12 pages.

"Kerr Pumps & FlowVale Awards for Excellence in Well Completion, Northeast 2017—Awarded to: U.S. Well Services," https:// www.oilandgasawards.com/winner/northeast-2017-kerr-pumps-flowvale-awards . . . , accessed Oct. 5, 2021, 4 pages.

"New Technology Development Award—General/Products, Northeast 2015—Awarded to: U.S. Well Services, LLC," https://www. oilandgasawards.com/winner/northeast-2015-new-technology-development-award-generalproducts/#, accessed Aug. 23, 2021, 4 pages.

*U.S. Well Services, Inc.* v. *Halliburton Company,* Civil Docket for Case # 6:21-cv-00367-ADA, https://ecf.txwd.uscourts.gov/cgi-bin/ DktRpt.pl?190912742001885-L_1_0-1, Accessed Nov. 29, 2021, 13 pages.

A. T. Dufresne, "How reliable are trial dates relied on by the PTAB in the Fintiv analysis?" Perkins Coie, 2021, 3 pages.

J. Malinowski et al., "Petrochemical Standards A Comparison Between IEEE 841-2001, API 541, and API 547," 2004, IEEE, Paper No. PCIC-2004-22, 8 pages.

"Petroleum Alumnus and Team Develop Mobile Fracturing Unit that Alleviates Environmental Impact," 2015, LSU, https://www. lsu.edu/eng/news/2015/07/20150713-mobile-fracturing-unit.php, accessed Sep. 22, 2021, 2 pages.

Liz Hampton, "Low-cost fracking offers boon to oil producers, headaches for suppliers," Reuters, Sep. 12, 2019, https://www. reuters.com/article/us-usa-oil-electric-fracturing-focus/low-cost-fracking-offers-boon-to-oil-producers-headaches-for-supplies, 11 pages.

Liz Hampton, "U.S. Well Services files e-frac patent lawsuit against Halliburton, Cimarex Energy," Reuters, Apr. 15, 2021, https://www. reuters.com/business/energy/us-well-services-files-e-frac-patent-lawsuit-against-halliburton-cimarex-energy, 10 pages.

Gardner Denver, 3" 1502 Male Hammer Union Discharge Flange, 2005, 13 pages.

"Services—U.S. Well Services," http://uswellservices.com/ services/, accessed Nov. 13, 2021, 10 pages.

Donald G. Fink, "Standard Handbook for Electrical Engineers—Thirteenth Edition," 1993, McGraw-Hill Inc., pp. 10-13, 20-21, 20-22, 20-85, 20-20, 20-89, 20-90, 20-91, 22-12, 22-13, 22-14, 22-15 and 22-16.

Email from Michael See on Jun. 10, 2021 regarding API-541 Fourth Edition: Public Availability, 2 pages.

Halliburton, Halliburton All-Electric Fracturing Reducing Emissions and Cost Brochure, 2021, 6 pages.

IEEE Power Engineering Society, 112 IEEE Standard Test Procedure for Polyphase Induction Motors and Generators, 2004, 87 pages.

*U.S. Well Services, LLC* v *Tops Well Services, LLC,* Case No. 3:19-cv-237, Document 135, Order, Sep. 22, 2021, 2 pages.

*U.S. Well Services, Inc. and U.S. Well Services, LLC* v *Halliburton Company and Cimarex Energy Co.,* Case No. 6:21-cv-00367-ADA, Document 56, Defendants' Opening Claim Construction Brief, Oct. 27, 2021, 46 pages.

"Screenshot of USWS Clean Fleet System Video," 1 page.

John Daniel, "8.30 DEP Industry Observations: New Flac Fleet; New Fleet Designs Forthcoming," Daniel Energy Partners, Aug. 30, 2020, 13 pages.

Declaration of Joel N. Broussard, IPR2021-01034, IPR2021-01035, IPR2021-01036, and IPR2021-01037, Oct. 20, 2021, 11 pages.

Declaration of Robert Schaaf, IPR2021-01034, Oct. 20, 2021, 47 pages.

Declaration of Dr. Mark Ehsani, IPR2021-01035, Jun. 18, 2021, 188 pages.

U.S. Pat. No. 9,970,278.

Stan Gibilisco, The Illustrated Dictionary of Electronics: Audio/ Video Consumer Electronics Wireless Technology—Eighth Edition, 2001, p. 667.

Declaration of Robert Schaaf, IPR2021-01035, Oct. 20, 2021, 51 pages.

Declaration of Dr. L. Brun Hilbert, P.E., IPR2021-01037 and IPR2021-01038, Jun. 21, 2021, 124 pages.

Declaration of Robert Schaaf, IPR2021-01037, Oct. 20, 2021, 52 pages.

Zeus Electric Pumping Unit, Halliburton, http://www.halliburton. com/en/products/zeus-electric-pumping-unit, 2021, 4 pages.

Declaration of Joel N. Broussard, IPR2021-01038, Oct. 20, 2021, 11 pages.

*LedComm LLC* v *Signify North America Corporation,* Case No. 6:20-cv-01056-ADA, Civil Docket, accessed Dec. 8, 2021, 11 pages.

*U.S. Well Services, Inc.* v *Halliburton Company,* Case No. 6:21-cv-00367-ADA, Civil Docket, accessed Dec. 13, 2021, 14 pages.

Declaration of Robert Schaaf, IPR2021-01038, Nov. 10, 2021, 40 pages.

*Transcend Shipping Systems LLC* v *Mediterranean Shipping Company S.A.,* Case No. 6:21-cv-00040, Document 27, Order of Dismissal with Prejudice, Dec. 7, 2021, 1 page.

Centers for Disease Control and Prevention, NIOSH Numbered Publications, https://web.archive.org/web/20120721180008/http:// www.cdc.org/niosh/pubs/all_date_desc_nopubnumbers.html, 2012, 57 pages.

America Invents Act, H.R. Rep. No. 112-98, Jun. 1, 2011, 165 pages.

Declaration of Joel N. Broussard, IPR2021-01065, Oct. 20, 2021, 11 pages.

Declaration of Dr. Robert Durham, IPR2021-01065, Jun. 18, 2021, 138 pages.

Declaration of Robert Schaaf, IPR2021-01065, Nov. 10, 2021, 33 pages.

U.S. Pat. No. 9,410,410, Excerpt—Response to Non-Final Office Action filed Feb. 3, 2016.

U.S. Appl. No. 62/242,566.

Industrial Safety & Hygiene News, OSHA issues hazard alert for fracking and drilling, Jan. 6, 2015, 1 page.

Portfolio Media Inc., A Shift to Sand: Spotlight on Silica Use in Fracking, Law360, https://www.law360.com/articles/366057/print? section=energy, accessed Jun. 10, 2021, 5 pages.

Henry Chajet, "OSHA Issues Alert on Non-Silica Fracking Hazards," Jan. 30, 2015, National Law Review Newsroom, 2 pages.

*U.S. Well Services, LLC,* v *Voltagrid LLC, Nathan Ough, Certarus (USA) Ltd., and Jared Oehring,* Case No. 4:21-cv-3441-LHR, Document 13, Plaintiff U.S. Well Services, LLC's Motion for Preliminary Injunction and Request for Hearing, Nov. 4, 2021, 311 pages.

U.S. Department of Labor—Occupational Safety and Health Administration, Hydraulic Fracturing and Flowback Hazards Other than Respirable Silica, 27 pages.

U.S. Department of Labor—Occupational Safety and Health Administration, Hazard Alert—Worker Exposure to Silica during Hydraulic Fracturing, 2012, 7 pages.

U.S. Department of Labor—Occupational Safety and Health Administration, OSHA and NIOSH issued hazard alert on ensuring workers in hydraulic fracturing operations have appropriate protections from silica exposure, Jun. 21, 2012, 4 pages.

(56) References Cited

OTHER PUBLICATIONS

Occupational Safety and Health Administration—Home, United States Department of Labor, https://web.archive.org/web/20120722160756/http://www.osha.gov/, accessed Jun. 13, 2021, 2 pages.

Industry/Hazard Alerts, United States Department of Labor, https://web.archive.org/web/20120801064838/http://www.osha.gov:80/hazardindex.html, accessed Jun. 13, 2021, 1 page.

Hazard Alert—Worker Exposure to Silica during Hydraulic Fracturing, United States Department of Labor, https://web.archive.org/web/20120808200919/http://www.osha.gov/dts/hazardalerts/hydraulic_frac_hazard_alert.html, accessed Jun. 13, 2021, 5 pages.

A. Abbott, Crippling the Innovation Economy: Regulatory Overreach at the Patent Office, Regulatory Transparency Project, Aug. 14, 2017, 35 pages.

D. Heidel, Safety and Health Management Aspects for Handling Silica-based Products and Engineered Nanoparticles In Sequences of Shale Reservoir Stimulations Operations, Society of Petroleum Engineers, 2004, 4 pages.

Testimony of Judge Paul R. Michel (Ret.) United States Court of Appeals for the Federal Circuit Before the Subcommittee on Intellectual Property, U.S. Senate Committee on the Judiciary, Jun. 4, 2019, 8 pages.

Bernard D. Goldstein, The Role of Toxicological Science in Meeting the Challenges and Opportunities of Hydraulic Fracturing, 2014, Toxicological Sciences, vol. 139, No. 2, pp. 271-283.

Mike Soraghan, OSHA issues hazard alert for fracking and drilling, E&E, Dec. 10, 2014, 1 page.

U.S. Well Services, Inc. files suit against Halliburton Company and Cimarex Energy Co. for patent infringement, Apr. 15, 2021, PR Newswire, https://www.prnewswire.com/news-releases/us-well-services-inc-files-suit-against-halliburton-company-and-cimarex-energy-co-for-patent-infringement-301270118.html, 2 pages.

Publications, U.S. Department of Labor—Occupational Safety and Health Administration, https://web.archive.org/web/20150626140537/https://www.osha.gov/pls/publications/publication.html, 47 pages.

OSHA Publications, U.S. Department of Labor—Occupational Safety and Health Administration, https://web.archive.org/web/20150406054914/https://www.osha.gov/pls/publications/publication.AthruZ?pType=Industry, Jun. 13, 2021, 3 pages.

U.S. Department of Labor—Occupational Safety and Health Administration, https://web.archive.org/web/20150406152927/https://www.osha.gov/, 4 pages.

Steven C. Carlson, Weaponizing IPRs, Landslide, Sep. 22, 2019, 10 pages.

Declaration of Dr. Mark Ehsani, IPR2021-01066, Jul. 2, 2021, 213 pages.

Declaration of Robert Schaaf, IPR2021-01066, Nov. 17, 2021, 43 pages.

U.S. Appl. No. 62/323,303.

Amazon.com purchase page for Electrical Engineering Reference Manual for the Electrical and Computer PE Exam, Sixth Edition, https://web.archive.org/web/20070103124447/https:/www.amazon.com/Electrical-Engineering-Reference-Manual-Computer/dp/1888577568/, accessed Jul. 23, 2021, 7 pages.

Public Catalog of the U.S. Copyright Office for search result: electrical engineering reference manual, https://cocatalog.loc.gov/cgi-bin/Pwebrecon.cgi?v1=6&ti=1, 6&Search_Arg=electrical engineering referencemanual&Search_Code=TALL&CNT=25&PI . . . , accessed Jul. 21, 2021, 2 pages.

Declaration of Robert Schaaf, IPR2021-01238, Nov. 17, 2021, 38 pages.

John A. Camera, PE, Electrical Engineering Reference Manual for the Electrical and Computer PE Exam, Sixth Edition, 2002, 102 pages.

U.S. Appl. No. 62/180,289.

IEEE 100 The Authoritative Dictionary of IEEE Standards Terms Seventh Edition, 2000, 7 pages.

National Electrical Manufacturers Association, NEMA ICS 61800-4 Adjustable Speed Electrical Power Drive Systems, Part 4: General Requirements—Rating Specifications for A.C. Power Drive Systems above 1000 V a.c. and Not Exceeding 35 kV, 2004 22 pages.

Professional Publications, Inc., FE Exam, PE Exam, ARE Exam, and NCIDQ Exam Review / Professional Engineering Licensing, About PPI, https://web.archive.org/web/20031219231426/http://ppi2pass.com:80/catalog/servlet/MyPpi_pg_aboutppi.html, accessed Jul. 22, 2021, 1 page.

Professional Publications, Inc., FE Exam, PE Exam, ARE Exam, and NCIDQ Exam Review / Professional Engineering Licensing, What PPI Customers Say, https://web.archive.org/web/20031226130924/http://ppi2pass.com:80/catalog/servlet/MyPpi_pg_comments-EEcomments.html, accessed Jul. 22, 2021, 2 pages.

Professional Publications, Inc., FE Exam, PE Exam, ARE Exam, and NCIDQ Exam Review / Professional Engineering Licensing, Homepage, https://web.archive.org/web/20040209054901/http://ppi2pass.com:80/catalog/servlet/MyPpi, accessed Jul. 19, 2021, 1 page.

Professional Publications, Inc., FE Exam, PE Exam, ARE Exam, and NCIDQ Exam Review / Professional Engineering Licensing, The PPI Online Catalog, https://web.archive.org/web/20040215142016/http://ppi2pass.com:80/catalog/servlet/MyPpi_ct_MAIN, accessed Jul. 19, 2021, 2 pages.

Professional Publications, Inc., FE Exam, PE Exam, ARE Exam, and NCIDQ Exam Review / Professional Engineering Licensing, Electrical PE Exam Review Products, https://web.archive.org/web/20040214233851/http://ppi2pass.com:80/catalog/servlet/MyPpi_ct_ELECTRICAL, accessed Jul. 19, 2021, 7 pages.

Professional Publications, Inc., FE Exam, PE Exam, ARE Exam, and NCIDQ Exam Review / Professional Engineering Licensing, Instructor's Corner, https://web.archive.org/web/20031219232547/http://ppi2pass.com:80/catalog/servlet/MyPpi_pg_corner-corner.html, accessed Jul. 19, 2021, 2 pages.

Professional Publications, Inc., FE Exam, PE Exam, ARE Exam, and NCIDQ Exam Review / Professional Engineering Licensing, Teaching an Electrical and Computer Engineering PE Exam Review Course, https://web.archive.org/web/20031223100101/http://ppi2pass.com:80/catalog/servlet/MyPpi_pg_corner-teachee.html, accessed Jul. 19, 2021, 2 pages.

Professional Publications, Inc., Electrical Engineering Reference Manual, 12 pages.

Professional Publications, Inc., Books for the FE, PE, FLS and PLS Exams, Spring 2004, http://www.ppi2pass.com/corner/catalog.pdf, 16 pages.

Lionel B. Roe, Practices and Procedures of Industrial Electrical Design, 1972, McGraw-Hill, Inc., Chapter 2: The Basic Electric System, 11 pages.

Declaration of Duncan Hall, Jul. 23, 2021, https://web.archive.org/web/20031219231426/http://ppi2pass.com:80/catalog/servlet/MyPpi_pg_aboutppi.html, 12 pages.

Declaration of Robert Durham, IPR2021-01315, Aug. 12, 2021, 209 pages.

Declaration of Robert Schaaf, IPR2021-01315, Nov. 19, 2021, 39 pages.

Excerpt of U.S. Pat. No. 9,893,500.

U.S. Appl. No. 62/323,168.

*U.S. Well Services, Inc. and U.S. Well Services, LLC* v *Halliburton Company and Cimarex Energy Co.,* Case No. 6:21-cv-00367-ADA, Document 63, Defendants' Claim Construction Brief in Reply to U.S. Well Services, LLC's Responsive Brief, Dec. 2, 2021, 30 pages.

*U.S. Well Services, Inc.* v *Halliburton Company,* Case No. 6:21-cv-00367-ADA, Civil Docket, accessed Dec. 17, 2021, 14 pages.

*U.S. Well Services, Inc.* v *Halliburton Company,* Case No. 6:21-cv-00367-ADA, Document 64, Order Resetting Markman Hearing, Dec. 8, 2021, 1 page.

Approved American National Standard, ANSI/NEMA MG Jan. 2011, American National Standard Motors and Generators, Dec. 9, 2021, 636 pages.

Comprehensive Power: Power it Up, Feb. 27, 2013, 28 pages.

Comprehensive Power: Power it Up, Brochure, 26 pages.

Declaration of Robert Schaaf, IPR2021-01316, Nov. 19, 2021, 33 pages.

(56) References Cited

OTHER PUBLICATIONS

Declaration of Robert Durham, IPR2021-01316, Aug. 13, 2021, 75 pages.
Declaration of Robert Schaaf, IPR2021-01538, Dec. 28, 2021, 40 pages.
Declaration of Dr. L. Brun Hilbert, Jr., P.E., IPR2021-01538, Sep. 22, 2021, 99 pages.
Maxwell James Clerk 1868, On Governors, Proc. R. Soc. Lond., pp. 16270-16283.
Katsuhiko Ogata, Modern Control Engineering: Third Edition, 1997, 2 pages.
49 C.F.R. Part 393 (Oct. 1, 2006), 36 pages.
The American Heritage Dictionary of the English Language, Fifth Edition, Fiftieth Anniversary, p. 911.
Collins English Dictionary, Twelfth Edition, 2014, p. 1005.
Declaration of Robert Schaaf, IPR2021-01539, Jan. 25, 2022, 37 pages.
Department of Transportation, Federal Motor Carrier Safety Administration, 49 CFR Parts 390, 392 and 393—Parts and Accessories Necessary for Safe Operation; General Amendments; Final Rule, Federal Register, Aug. 15, 2005, vol. 70, No. 156, 49 pages.
D. Nedelcut et al., "On-line and Off-line Monitoring-Diagnosis System (MDS) for Power Transformers," IEEE, 2008 International Conference on Condition Monitoring and Diagnosis, Beijing, China, Apr. 21-24, 2008, 7 pages.
Random House Webster's Unabridged Dictionary, Second Edition, 2001, p. 990.
A. B. Lobo Ribeiro et al., "Multipoint Fiber-Optic Hot-Spot Sensing Network Integrated Into High Power Transformer for Continuous Monitoring," IEEE Sensors Journal, Jul. 2008, vol. 8, No. 7, pp. 1264-1267.
Society of Automotive Engineers, SAE J1292: Automobile, Truck, Truck-Tractor, Trailer, and Motor Coach Wiring, 49 CFR 393.28, Oct. 1981, 6 pages.
"StarTech NETRS2321E 1 Port RS-232/422/485 Serial over IP Ethernet Device Server," StarTech, http://www.amazon.com/StarTech-NETRS2321E-RS-232-Serial-Ethernet/dp/B000YN0N0S, May 31, 2014, 4 pages.
"StarTech.com 1 Port RS232 Serial to IP Ethernet Converter (NETRS2321P)," StarTech, http://www.amazon.com/StarTech-com-Serial-Ethernet-Converter-NETRS232IP/dp/B00FJEHNSO, Oct. 9, 2014, 4 pages.
"TCP/IP Ethernet to Serial RS232 RS485 RS422 Converter," ATC, http://www.amazon.com/Ethernet-Serial-RS232-RS485-Converter/dp/B00ATV2DX2, Feb. 1, 2014, 2 pages.
"SainSmart TCP/IP Ethernet to Serial RS232 RS485 Intelligent Communication Converter," SainSmart, http://www.amazon.com/SainSmart-Ethernet-Intelligent-Communication-Converter/dp/B008BGLUHW, Aug. 17, 2014, 4 pages.
"Global Cache iTach, IP to Serial with PoE (IP2SL-P)," Global Cache, https://www.amazon.com/Global-Cache-iTach-Serial-IP2SL-P/dp/B003BFVNS4/, Oct. 30, 2014, 3 pages.
Declaration of Robert Durham, IPR2022-00074, Nov. 8, 2021, 177 pages.
Declaration of Robert Schaaf, IPR2022-00074, Feb. 17, 2022, 36 pages.
U.S. Appl. No. 62/204,331.
Eugene A. Avallone, Marks' Standard Handbook for Mechanical Engineers: 11th Edition, 2007, p. 16-4 and 16-22.

Moxa 802.11 Ethernet to Serial, Moxastore, http://www.moxastore.com/Moxa_802_11_Wi_Fi_Ethernet_to_Serial_s/587.html, May 24, 2016, 1 page.
Project Registration, Moxastore, http://www.moxastore.com, Feb. 15, 2015, 2 pages.
About Us, Moxastore, http://www.moxastore.com/aboutus.asp, Mar. 8, 2015, 1 page.
NPORTIA5250, Moxastore, http://www.moxastore.com/NPORTIA5250_p/nportia5250.htm.
Declaration of Duncan Hall, Internet Archive, Oct. 26, 2021, https://web.archive.org/web/20140531134153/http://www.amazon.com/StarTech-NETRS2321E-RS-232-Serial-Ethernet/dp/B000YB0NOS, 43 pages.
Michael Quentin Morton, Unlocking the Earth: A Short History of Hydraulic Fracturing (2013), GeoExpro, vol. 10, No. 6, 5 pages.
Accommodating Seismic Movement, Victaulic Company, 2015, https://web.archive.org/web/20150412042941/http://www.victaulic.com:80/en/businesses-solutions/solutions/accommoda . . . , 2 pages.
Style W77 AGS Flexible Coupling, Victaulic Company 2015, https://web.archive.org/web/20150423052817/http://www.victaulic.com:80/en/products-services/products/style-w77-ags-f . . . , 1 page.
AGS Large Diameter Solutions, Victaulic Company, 2015, https://web.archive.org/web/20150419063052/http://www.victaulic.com:80/en/businesses-solutions/solutions/advanced-gr . . . , 2 pages.
Chiksan Original Swivel Joints, FMC, 1997, 16 pages.
CoorsTek Flowguard Products, 2012, 8 pages.
Declaration of Sylvia D. Hall-Ellis, IPR2022-00610, Feb. 28, 2022, 98 pages.
Excerpt of U.S. Pat. No. 10,119,381.
Excerpt of U.S. Pat. No. 10,934,824.
Flowline Products and Services, FMC Technologies, http://www.fmctechnologies.com, 80 pages.
Gardner Denver, Well Servicing Pump Model GD-2500Q, GD-2500Q-HD, Quintuplex Pumps, Sep. 2011, 45 pages.
Eugene A. Avallone, Marks' Standard Handbook for Mechanical Engineers: 11th Edition, 2007, Section 14, 18 pages.
Mohinder L. Nayyar, Piping Handbook Seventh Edition, McGraw-Hill Handbook, 2000, 77 pages.
Pulsation Dampers, Coorstek, 2014, https://web.archive.org/web/20140919005733/http://coorstek.com/markets/energy_equip . . . , 2 pages.
M. E. Rahman et al., "Wire rope isolators for vibration isolation of equipment and structures—A review," IOP Conference Series Materials Science and Engineering, Apr. 2015, 12 pages.
Victaulic Couplings Vibration Attenuation Characteristics, Victaulic, Publication 26.04, Oct. 2014, 5 pages.
Thorndike Saville, The Victaulic Pipe Joint, Journal of American Water Works Association, Nov. 1922, vol. 9, No. 6, pp. 921-927.
J. C. Wachel et al., "Analysis of Vibration and Failure Problems in Reciprocating Triplex Pumps for Oil Pipelines," The American Society of Mechanical Engineers, Presented at the Energy-Sources and Technology Conference and Exhibition, Dallas, Texas, Feb. 17-21, 1985, 8 pages.
Declaration of Nathaniel E. Frank-White, Internet Archive, Feb. 17, 2022, http://web.archive.org/web/20140329090440/http://www.enidline.com/pdffiles/WR_Catalog_2012.pdf, 82 pages.
Wire Rope Isolator Technologies, Enidine, Dec. 2011, 78 pages.
World's Best Swivel Joints, Flowvalve, 2013, https://web.archive.org/web/20150117041757/http://www.flowvalve.com:80/swivels, 10 pages.
Machine translation of CN110118075A, description only, 12 pages.
Machine translation of CN110118075A, claims only, 4 pages.

* cited by examiner

160

162

164

166

168

170

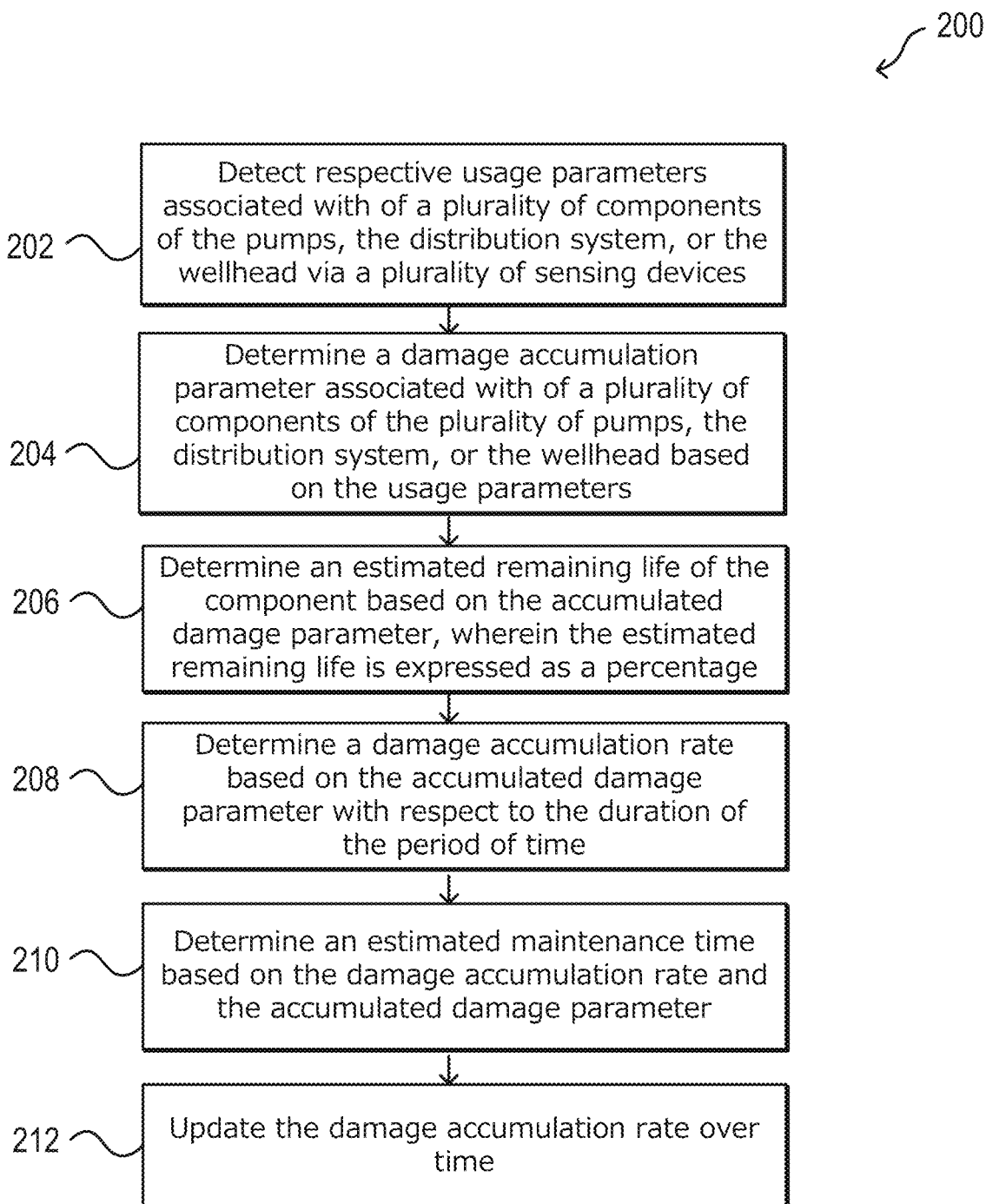

200

202 — Detect respective usage parameters associated with of a plurality of components of the pumps, the distribution system, or the wellhead via a plurality of sensing devices 204 — Determine a damage accumulation parameter associated with of a plurality of components of the plurality of pumps, the distribution system, or the wellhead based on the usage parameters 206 — Determine an estimated remaining life of the component based on the accumulated damage parameter, wherein the estimated remaining life is expressed as a percentage 208 — Determine a damage accumulation rate based on the accumulated damage parameter with respect to the duration of the period of time 210 — Determine an estimated maintenance time based on the damage accumulation rate and the accumulated damage parameter 212 — Update the damage accumulation rate over time

FIG.7

DAMAGE ACCUMULATION METERING FOR REMAINING USEFUL LIFE DETERMINATION

CROSS-REFERENCE TO RELATED APPLICATIONS

This application claims priority to and the benefit of co-pending U.S. Provisional Patent Application Ser. No. 62/821,193 filed Mar. 20, 2019 titled "DAMAGE ACCU-MULATION METERING FOR REMAINING USEFUL LIFE DETERMINATION," the full disclosure of which is hereby incorporated herein by reference in its entirety for all purposes.

BACKGROUND

1. Technical Field

This disclosure relates generally to oilfield equipment and more particularly to systems and methods for tracking equipment damage and remaining useful life.

2. Background

Oil and gas operations, such as hydraulic fracturing, utilize many types of equipment such as pumps, manifolds, and engines, among others. These pieces of equipment are susceptible to wear and damage over time, which consumes its useful life. Currently, preventative maintenance may be performed according to a schedule based on operating time, cycles, set intervals of time or the like. Similarly, useful life is also generally determined based on factors such as total operating time. These conventional methods utilize very broad rules for maintenance scheduling and useful life calculations, which may not be very precise. This means that maintenance or equipment replacement may be performed when not actually needed, which is wasteful. Conversely, maintenance or equipment replacement may not be per-formed when actually needed, leading to equipment failures, which are also costly.

SUMMARY

The present disclosure is directed to systems and methods for tracking damage accumulation of equipment in order to determine maintenance and useful life determinations. The systems and method of this disclosure use the intelligence gathered from a piece of machinery indicating the condition at which it was operating. This provides the most accurate indication of when and what type of maintenance or other procedures need to be performed on a piece of equipment. Damage accumulation rate is a number that calculates the rate at which a piece of equipment is accumulating damage. The faster that a piece of equipment accumulates damage, then the faster it will consume its useful life. The lower the damage accumulation rate number, then the slower that a piece of equipment will consume its useful life. This rate is a method of monitoring current operating conditions for a piece of machinery and classifying it at varying levels of health. Taking this information, an algorithm is created that tracks and accumulates the total history of a piece of machinery to better predict events such as maintenance, failures, and other issues. Thus, a countdown of remaining useful life can be created based on this. This information can update daily or any other determined time frame to display a percent life (%) remaining.

In some embodiments, a hydraulic fracturing system with damage accumulation monitoring includes a pump system fluidly coupled to a wellhead at a wellsite to pump a fracturing fluid into the wellhead, a blender configured to mix together proppant and a fluid mixture to form the fracturing fluid, a proppant storage and delivery system configured to provide the proppant for the blender, a hydra-tion unit configured to mix an additive into a fluid to form the fluid mixture and provide the fluid mixture to the blender, a fluid storage and delivery system configured to provide the fluid for the hydration unit, an additive storage and delivery system configured to provide the additive to the hydration unit, and a damage accumulation monitoring system. The damage accumulation monitoring system includes a plurality of sensing devices and integrated into one or more components of the pump system, the blender system, the proppant storage and delivery system, the fluid storage and delivery system, and the additive storage and delivery system. The damage accumulation sensor system is configured to monitor a plurality of parameters of the hydraulic fracturing system via the plurality of sensing devices to determine respective accumulated damage mea-surements of the one or more components. In some embodi-ments, the accumulated damage measurement of a compo-nent is indicative of an amount of actual usage incurred by the component during a period of time. The damage accu-mulation monitoring system may further determine an esti-mated remaining life of the component based on the accu-mulated damage measurement, wherein the estimated remaining life is expressed as a percentage. The damage accumulation monitoring system may further determine a damage accumulation rate based on the accumulated dam-age measurement with respect to the duration of the period of time. The damage accumulation monitoring system may further determine an estimated maintenance time based on the damage accumulation rate and the accumulated damage measurement. The damage accumulation monitoring system can update the damage accumulation rate over time as usage changes. The accumulated damage measurement is based at least in part on one or more of a set of parameters such as operation time, observed cycles, amount pumped, fuel con-sumed, power consumed, number of start/stops, or amount of flow.

In some embodiments, a hydraulic fracturing system with damage accumulation monitoring includes a plurality of hydraulic fracturing equipment positioned at a wellsite, including one or more pumps configured to pressurize a fracturing fluid and a distribution system fluidly coupled to receive and consolidate fracturing fluid from the plurality of pumps for injection into a wellhead. The hydraulic fractur-ing system also includes a damage accumulation monitoring system, including a plurality of sensing devices integrated into respective components of the plurality of hydraulic fracturing equipment, the plurality of sensing devices con-figured to measure a plurality of usage parameters of the respective components, and a processing device configured to receive the plurality of usage parameters and determine respective damage accumulation measurements of the respective components based at least in part on the usage parameters. The accumulated damage measurement of a component is indicative of an amount of actual usage incurred by the component during a period of time. The damage accumulation monitoring system further determines an estimated remaining life of the component based on the accumulated damage measurement, wherein the estimated remaining life is expressed as a percentage. The damage accumulation monitoring system further determines a damage accumulation rate based on the accumulated damage measurement with respect to the duration of the period of time. The damage accumulation monitoring system further determines an estimated maintenance time based on the damage accumulation rate and the accumulated damage measurement. The damage accumulation monitoring system updates the damage accumulation rate over time. The use parameters include one or more of a set of parameters including operation time, observed cycles, amount pumped, fuel consumed, power consumed, number of start/stops, or amount of flow.

In some embodiments, a hydraulic fracturing method includes providing a fracturing fluid to a plurality of pumps, pumping the fracturing fluid into a distribution system, injecting the fracturing fluid into a wellhead, detecting respective usage parameters associated with of a plurality of components of the plurality of pumps, the distribution system, or the wellhead via a plurality of sensing devices instrumented thereon, and determining a damage accumulation parameter associated with of a plurality of components of the plurality of pumps, the distribution system, or the wellhead based at least in part on the respective usage parameters. The accumulated damage parameter of a component is indicative of an amount of actual usage incurred by the component during a period of time. The method further includes determining an estimated remaining life of the component based on the accumulated damage parameter, wherein the estimated remaining life is expressed as a percentage. The method further includes determining a damage accumulation rate based on the accumulated damage parameter with respect to the duration of the period of time. The method further includes determining an estimated maintenance time based on the damage accumulation rate and the accumulated damage parameter. The method further includes updating the damage accumulation rate over time.

BRIEF DESCRIPTION OF DRAWINGS

Some of the features and benefits of the present disclosure having been stated, others will become apparent as the description proceeds when taken in conjunction with the accompanying drawings, in which:

FIG. 7 is a flow chart of an embodiment of a hydraulic fracturing method with damage accumulation monitoring, in accordance with embodiments of the present disclosure.

Figure 1:
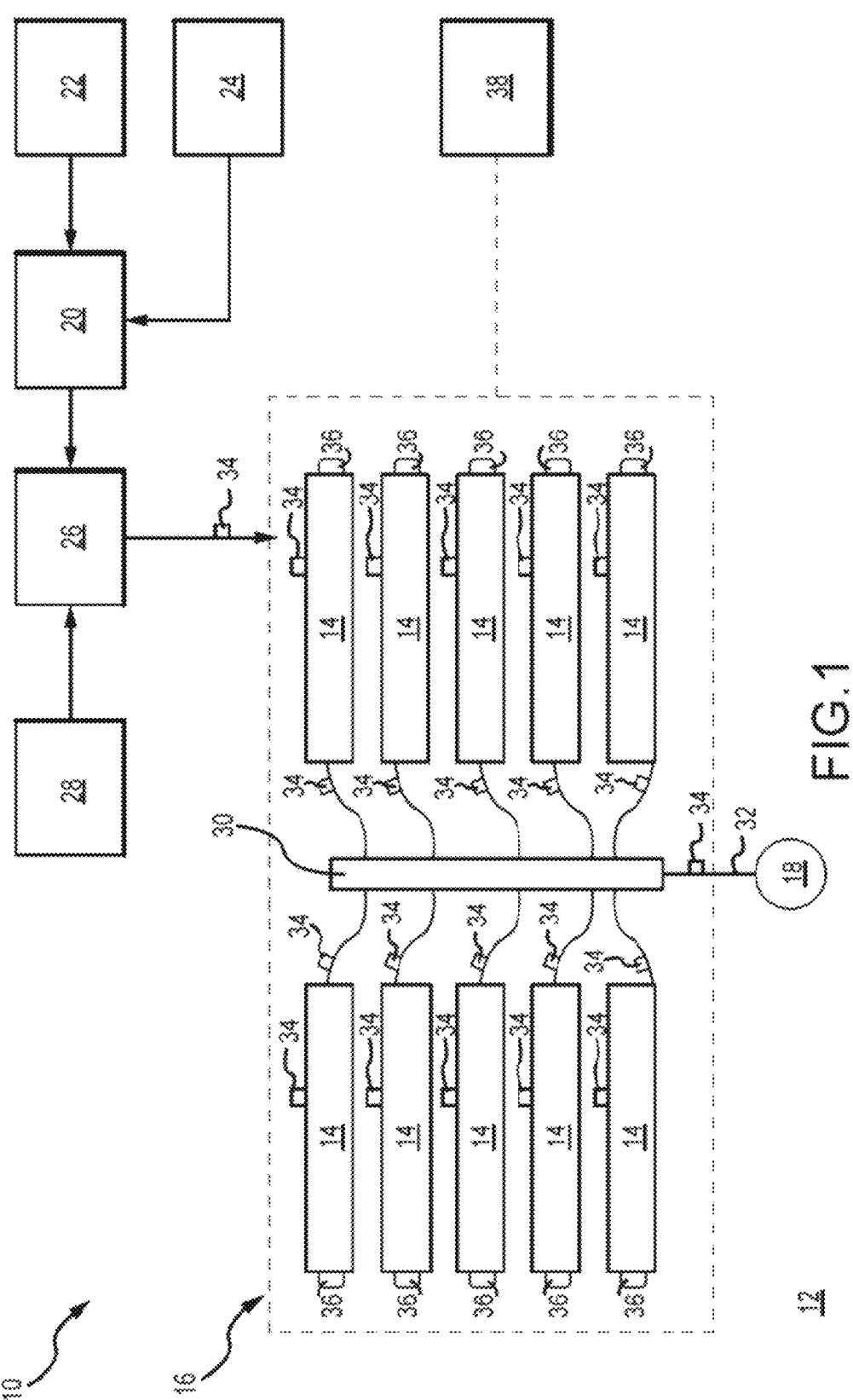
FIG. 1 is a schematic plan view of an embodiment of a fracturing operation, in accordance with embodiments of the present disclosure.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Additionally, recitations of steps of a method should be understood as being capable of being performed in any order unless specifically stated otherwise. Furthermore, the steps may be performed in series or in parallel unless specifically stated otherwise.

FIG. 1 is a plan schematic view of an embodiment of a hydraulic fracturing system 10 positioned at a well site 12. In the illustrated embodiment, pump trucks 14, which make up a pumping system 16, are used to pressurize a slurry solution for injection into a wellhead 18. An optional hydration unit 20 receives fluid from a fluid source 22 via a line, such as a tubular, and also receives additives from an additive source 24. In an embodiment, the fluid is water and the additives are mixed together and transferred to a blender unit 26 where proppant from a proppant source 28 may be added to form the slurry solution (e.g., fracturing slurry) which is transferred to the pumping system 16. The pump trucks 14 may receive the slurry solution at a first pressure (e.g., 80 psi to 160 psi) and boost the pressure to around 15,000 psi for injection into the wellhead 18. In certain embodiments, the pump trucks 14 are powered by electric motors.

After being discharged from the pump system 16, a distribution system 30, such as a missile, receives the slurry solution for injection into the wellhead 18. The distribution system 30 consolidates the slurry solution from each of the pump trucks 14 and includes discharge piping 32 coupled to the wellhead 18. In this manner, pressurized solution for hydraulic fracturing may be injected into the wellhead 18. In the illustrated embodiment, one or more sensors 34, 36 are arranged throughout the hydraulic fracturing system 10 to measure various properties related to fluid flow, vibration, and the like.

It should be appreciated that while various embodiments of the present disclosure may describe electric motors powering the pump trucks 14, in embodiments, electrical generation can be supplied by various different options, as well as hybrid options. Hybrid options may include two or more of the following electric generation options: Gas turbine generators with fuel supplied by field gas, CNG, and/or LNG, diesel turbine generators, diesel engine generators, natural gas engine generators, batteries, electrical grids, and the like. Moreover, these electric sources may include a single source type unit or multiple units. For example, there may be one gas turbine generator, two gas turbines generators, two gas turbine generators coupled with one diesel engine generator, and various other configurations.

In various embodiments, equipment at the well site may utilize 3 phase, 60 Hz, 690V electrical power. However, it should be appreciated that in other embodiments different power specifications may be utilized, such as 4160V or at different frequencies, such as 50 Hz. Accordingly, discussions herein with a particular type of power specification should not be interpreted as limited only the particularly discussed specification unless otherwise explicitly stated. Furthermore, systems described herein are designed for use in outdoor, oilfield conditions with fluctuations in temperature and weather, such as intense sunlight, wind, rain, snow, dust, and the like. In embodiments, the components are designed in accordance with various industry standards, such as NEMA, ANSI, and NFPA.

Figure 2:
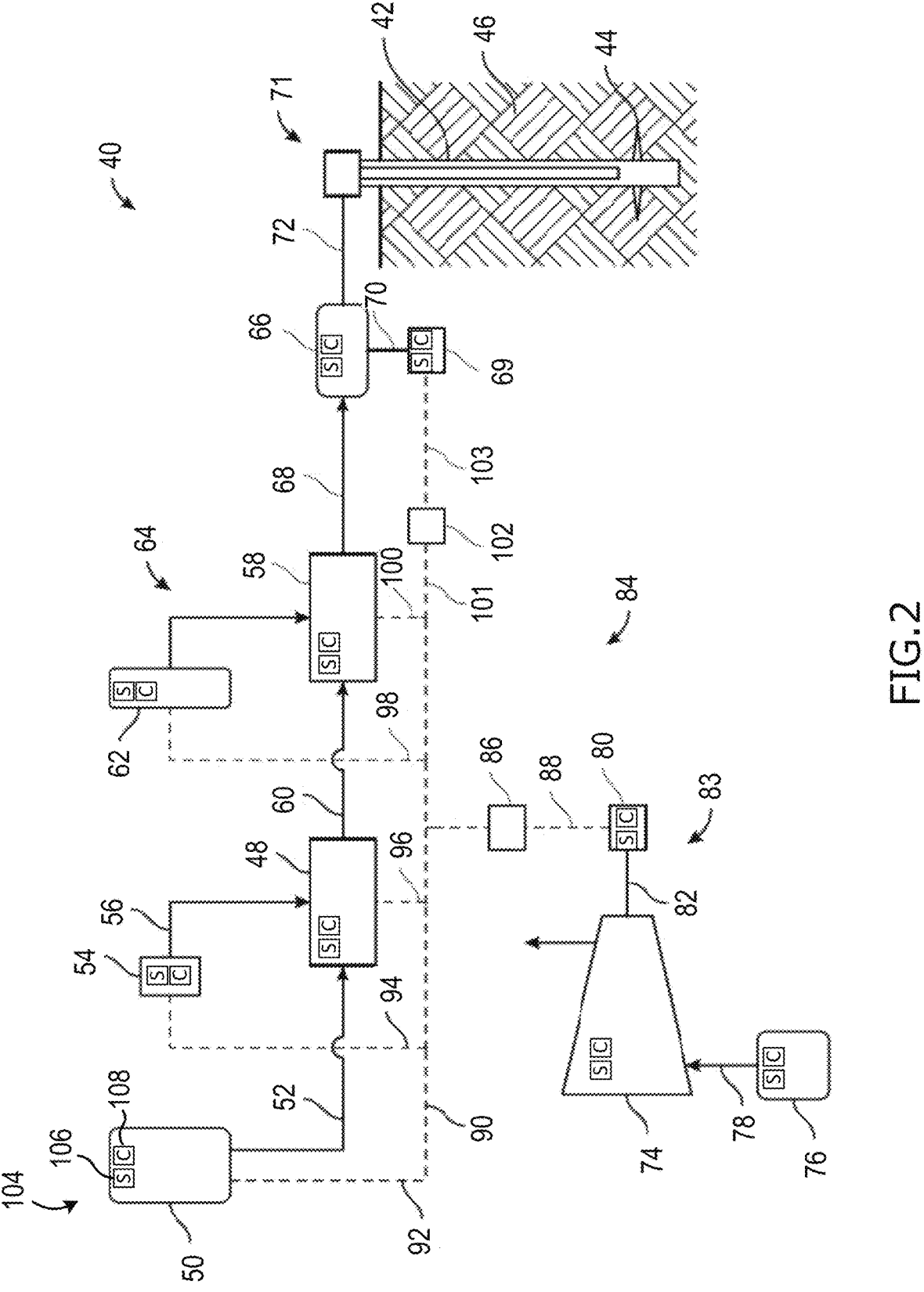
FIG. 2 is a schematic diagram of an embodiment of a hydraulic fracturing system with damage accumulation monitoring, in accordance with embodiments of the present disclosure.

FIG. 2 is a detailed schematic representation of a hydraulic fracturing system 40 with damage accumulation monitoring, that can be used for pressurizing a wellbore 42 to create fractures 44 in a subterranean formation 46 that surrounds the wellbore 42. Included with the system 40 is a hydration unit 48 that receives fluid from a fluid source 50 via line 52, and also selectively receives additives from an additive source 54 via line 56. Additive source 54 can be separate from the hydration unit 48 as a stand-alone unit, or can be included as part of the same unit as the hydration unit 48. The fluid, which in one example is water, is mixed inside of the hydration unit 48 with the additives. In an embodiment, the fluid and additives are mixed over a period of time, to allow for uniform distribution of the additives within the fluid. In the example of FIG. 2, the fluid and additive mixture is transferred to a blender unit 58 via line 60. A proppant source 62 contains proppant, which is delivered to the blender unit 58 as represented by line 64, where line 64 can be a conveyer. Inside the blender unit 58, the proppant and fluid/additive mixture are combined to form a fracturing fluid, which is then transferred to a fracturing pump system 66 via line 68. Thus, fluid in line 68 includes the discharge of blender unit 58 which is the suction (or boost) for the fracturing pump system 66.

Blender unit 58 can have an onboard chemical additive system, such as with chemical pumps and augers. Optionally, additive source 54 can provide chemicals to blender unit 58, or a separate and standalone chemical additive system (not shown) can be provided for delivering chemicals to the blender unit 58. In an example, the pressure of the fracturing fluid in line 68 ranges from around 80 psi to around 100 psi. The pressure of the fracturing fluid can be increased up to around 15,000 psi by pump system 66. A motor 69, which connects to pump system 66 via connection 40, drives pump system 66 so that it can pressurize the fracturing fluid. In one example, the motor 69 is controlled by a variable frequency drive ("VFD").

After being discharged from pump system 66, fracturing fluid is pumped into a wellhead assembly 71. Discharge piping 42 connects discharge of pump system 66 with wellhead assembly 71 and provides a conduit for the fracturing fluid between the pump system 66 and the wellhead assembly 71. In an alternative, hoses or other connections can be used to provide a conduit for the fracturing fluid between the pump system 66 and the wellhead assembly 71. Optionally, any type of fluid can be pressurized by the fracturing pump system 66 to form injection fracturing fluid that is then pumped into the wellbore 42 for fracturing the formation 44, and is not limited to fluids having chemicals or proppant.

An example of a turbine 74 is provided in the example of FIG. 1. The turbine 74 can be gas powered, receiving a combustible fuel from a fuel source 76 via a feed line 78. In one example, the combustible fuel is natural gas, and the fuel source 76 can be a container of natural gas or a well (not shown) proximate the turbine 74. Combustion of the fuel in the turbine 74 in turn powers a generator 80 that produces electricity. Shaft 82 connects generator 80 to turbine 74. The combination of the turbine 74, generator 80, and shaft 82 define a turbine generator 83. In another example, gearing can also be used to connect the turbine 74 and generator 80.

An example of a micro-grid 84 is further illustrated in FIG. 2, and which distributes electricity generated by the turbine generator 83. Included with the micro-grid 84 is a transformer 86 for stepping down voltage of the electricity generated by the generator 80 to a voltage more compatible for use by electrically powered devices in the hydraulic fracturing system 40. In another example, the power generated by the turbine generator and the power utilized by the electrically powered devices in the hydraulic fracturing system 10 are of the same voltage, such as 4160 V, so that main power transformers are not needed. In one embodiment, multiple 3500 kVA dry cast coil transformers are utilized. Electricity generated in generator 80 is conveyed to transformer 86 via line 88. In one example, transformer 86 steps the voltage down from 13.8 kV to around 600 V. Other step down voltages can include 4,160 V, 480 V, or other voltages.

The output or low voltage side of the transformer 56 connects to a power bus 90, lines 92, 94, 96, 98, 100, and 101 connect to power bus 90 and deliver electricity to electrically powered components of the system 40. More specifically, line 92 connects fluid source 20 to bus 90, line 94 connects additive source 24 to bus 90, line 96 connects hydration unit 18 to bus 90, line 98 connects proppant source 62 to bus 90, line 100 connects blender unit 28 to bus 90, and line 101 connects bus 90 to an optional variable frequency drive ("VFD") 102. Line 103 connects VFD 102 to motor 69. In one example, VFD 102 can be used to control operation of motor 69, and thus also operation of pump 66.

In an example, additive source 54 contains ten or more chemical pumps for supplementing the existing chemical pumps on the hydration unit 48 and blender unit 58. Chemicals from the additive source 54 can be delivered via lines 56 to either the hydration unit 48 and/or the blender unit 58. In one embodiment, the elements of the system 40 are mobile and can be readily transported to a wellsite adjacent the wellbore 42, such as on trailers or other platforms equipped with wheels or tracks.

In the illustrated embodiment, one or more instrumentation devices 104 such as various types of sensors 106 are arranged throughout the hydraulic fracturing system 40 and coupled to one or more of the aforementioned components, including any of the wellhead assembly 71, pump 66, blender unit 58, proppant source 62, hydration unit 48, additive source 54, fluid source 50, generator 80, turbine 74, fuel source 76, any deliveries lines, and various other equipment used in the hydraulic fracturing system 40, not all of which are explicitly described herein for sake of brevity. Specifically, the sensors 106 have be implemented of specific subcomponents of such equipment, such as engine, transmission, power ends RPMs, sand storage compartment gates, valves, and actuators, sand delivery belts and shoots, water storage compartments gates, valves, and actuators, water delivery lines and hoses, blender hydraulics such as chemical pumps, liquid and dry, fan motors for cooling packages, blender discharge pumps, electric and variable frequency powered chemical pumps and auger screws, suction and discharge manifold meters, valves, and actuators. For example, the instrumentation devices 104 may include hardware features such as, low pressure transducer (low and high frequency), high pressure transducers (low and high frequency), low frequency accelerometers, high frequency accelerometers, temperature sensors, external mounted flow meters such as doppler and sonar sensors, magnetic flow meters, turbine flow meters, proximity probes and sensors, speed sensors, tachometers, capacitive, doppler, inductive, optical, radar, ultrasonic, fiber optic, and hall effect sensors, transmitters and receivers, stroke counters, GPS location monitoring, fuel consumption, load cells, PLCs, and timers. In some embodiments, the instrumentation devices may be installed on the components and dispersed in various locations.

The components may also include communication means that enable all the sensor packages and equipment components to communicate with a monitoring unit. In some embodiments, the sensors may communicate with each other. Equipment can prevent failures, reduce continual damage, and control when it is allowed and not allowed to continue to operate based on live and continuous data readings. In some embodiments, the sensors may transmit data to a data van 38 for collection and analysis, among other things. In some embodiment, the sensors may transmit data to other components, to the central processing unit, or to devices and control units remote from the site. The communications between components, sensors, and control devices may be wired, wireless, or a combination of both. Communication means may include fiber optics, electrical cables, WiFi, Bluetooth, radio frequency, and other cellular, nearfield, Internet-based, or other networked communication means.

In some embodiments, instrumentation devices 104 (any of the above described, among others) can be imbedded, mounted, located in various locations such as in line with flow vessels like hoses, piping, manifolds, placed one pump components such as fluid ends, power ends, transmission, engines, and any component within these individual pieces, mounted external to piping and flow vessels, mounted on under or above sand and water storage containers. Blender hoppers could be duel equipped with hopper proximity level sensors as well as a load cell to determine amount of sand in the hopper at any given time.

Figure 3:
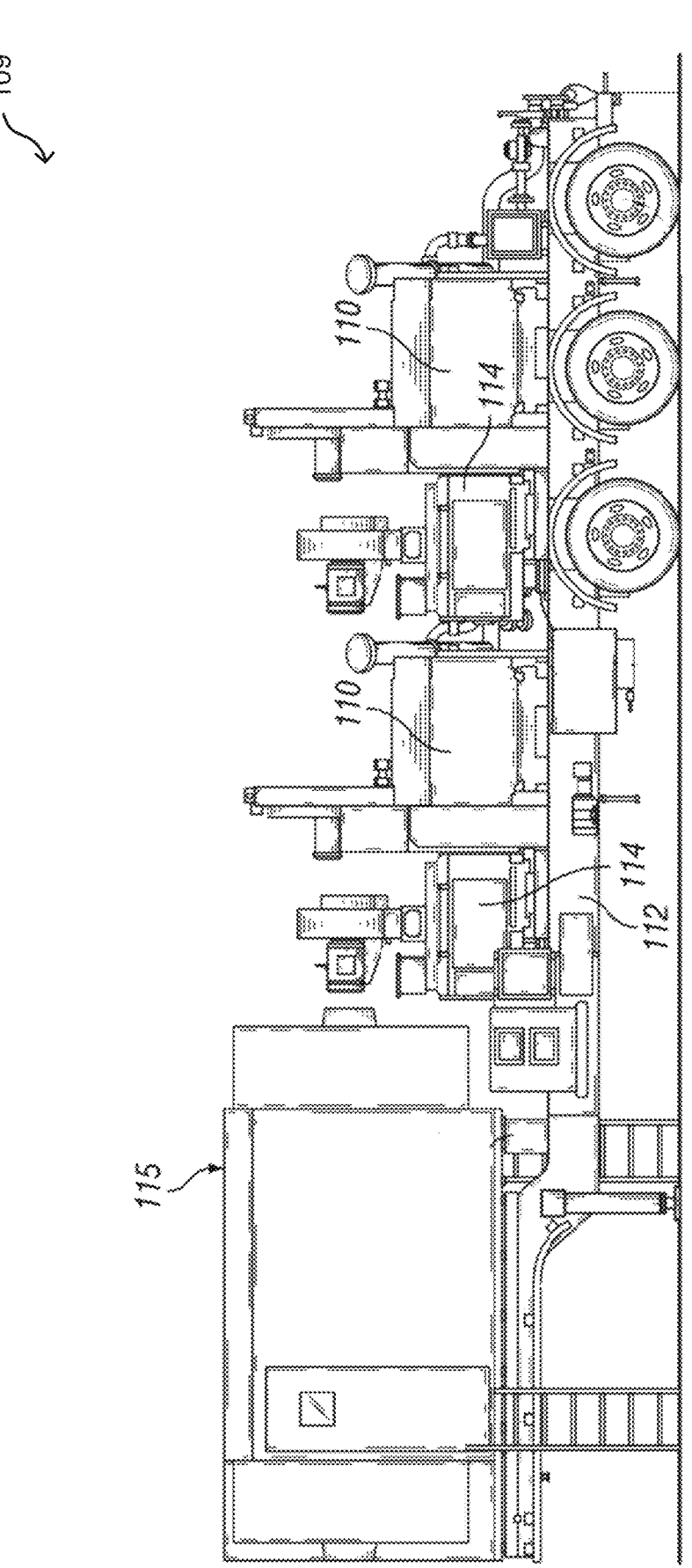
FIG. 3 illustrates a fracturing pump system with damage accumulation monitoring, in accordance with embodiments of the present disclosure.

FIG. 3 illustrates an example fracturing pump system 109, in accordance with example embodiments. As illustrated, the fracturing pump system 109 includes instrumented components, including motors 114, a transmission, a variable frequency drive (VFD) 115, pumps 110, a power end, and a fluid end. The fluid end may further include instrumented components such as packings, valves, seats, stay rod bolts, suction manifold, suction hoses, and discharge flow iron. These components may include embedded or retrofitted hardware devices which are configured to sense various conditions and states associated with the components. Example hardware devices include low pressure transducer (low and high frequency), high pressure transducers (low and high frequency), low frequency accelerometers, high frequency accelerometers, temperature sensors, external mounted flow meters such as doppler and sonar sensors, magnetic flow meters, turbine flow meters, proximity probes and sensors, speed sensors, tachometers, capacitive, doppler, inductive, optical, radar, ultrasonic, fiber optic, and hall effect sensors, transmitters and receivers, stroke counters, gps location monitoring, fuel consumption, PLCs, and timers. The system may be attached to a trailer 112 or a skid.

The fracturing pump components may also include various types of communications devices such as transmitters, receivers, or transceivers, using various communication protocols. This enables components of the fracturing pump components to communicate amongst each other or with a central control unit or remote device so monitor conditions, ensuring that the pumping process is completed effectively and consistently. Communication between the equipment can be both wired and/or wireless, such as through Ethernet. WiFi. Bluetooth, cellular, among other options. Data captured by the hardware can be displayed live locally, stored locally, displayed live remotely, or stored remotely. Such data may be accessed in real-time as well as stored and retrieved at a later time as historical data. In some embodiments, data from one component can be used to determine real time actions to be taken by another component to ensure proper functionality of each component. Specifically, this may allow equipment to adjust rates, pressure, operating conditions such as engine, transmission, power end rotations per minute (RPMs), valves, actuators, individual fracturing pump rates as well as collective system rates, fan motors for cooling packages, electric and variable frequency drive (VFD) powered electric motors for pumps, suction and discharge manifold meters, valves, and actuators. Equipment can prevent failures, reduce continual damage, and control operation based on live and continuous data readings.

Various types of hydraulic fracturing equipment and components are described in FIGS. 1-3. Many of these types of equipment and components are susceptible to wear and damage over time, which consumes its useful life. Currently, preventative maintenance may be performed according to a schedule based on operating time, cycles, set intervals of time or the like. Similarly, useful life is also generally determined based on factors such as total operating time. These conventional methods utilize very broad rules for maintenance scheduling and useful life calculations, which may not be very precise. This means that maintenance or equipment replacement may be performed when not actually needed, which is wasteful. Conversely, maintenance or equipment replacement may not be performed when actually needed, leading to equipment failures, which are also costly.

The systems and method of this disclosure use the intelligence gathered from a piece of machinery indicating the condition at which it was operating. This provides the most accurate indication of when and what type of maintenance or other procedures need to be performed on a piece of equipment. Damage accumulation rate is a number that calculates the rate at which a piece of equipment is accumulating damage. The faster that a piece of equipment accumulates damage, then the faster it will consume its useful life. The lower the damage accumulation rate number, then the slower that a piece of equipment will consume its useful life. This rate is a method of monitoring current operating conditions for a piece of machinery and classifying it at varying levels of health. Taking this information, an algorithm is created that tracks and accumulates the total history of a piece of machinery to better predict events such as maintenance, failures, and other issues. Thus, a countdown of remaining useful life can be created based on this. This information can update daily or any other determined time frame to display a life % remaining. This data can then be send to the cloud as well as other databases, such as a computerized maintenance management program.

Real time data capturing of equipment health being directly tied into the algorithm to display useful remaining life of any component, such as a pump components including: power ends, fluid ends, valves, seats, springs, discharge irons, check valves, suction hoses, coupling motors, engines, transmissions, pumps, and other components.

The damage accumulation rate can be added to other known data such as operating time, cycles, pounds of sand pumped, pumping hours, fuel consumed, MW of power consumed, and other statistics. Sensors can be used to incorporate additional data, such as vibration sensors, flow meters, pressure transducers, densitometers, cameras, and other sensors or inputs.

Currently there are other various methods that don't actually count consumed life of a component. These methods are not tracking the operating conditions of the equipment and how that is affecting its remaining life. Additionally, just taking just the operation rate of a piece of equipment at the current time does not provide a complete picture of the operation conditions over the life of the equipment. By creating an algorithm that takes damage accumulation rate and generates a current view of the life expectancy of a component, a new metric is created. It would be a floating scale that would adjust automatically based on current and future operating conditions, but still taking past operating conditions into account.

Figure 4A:
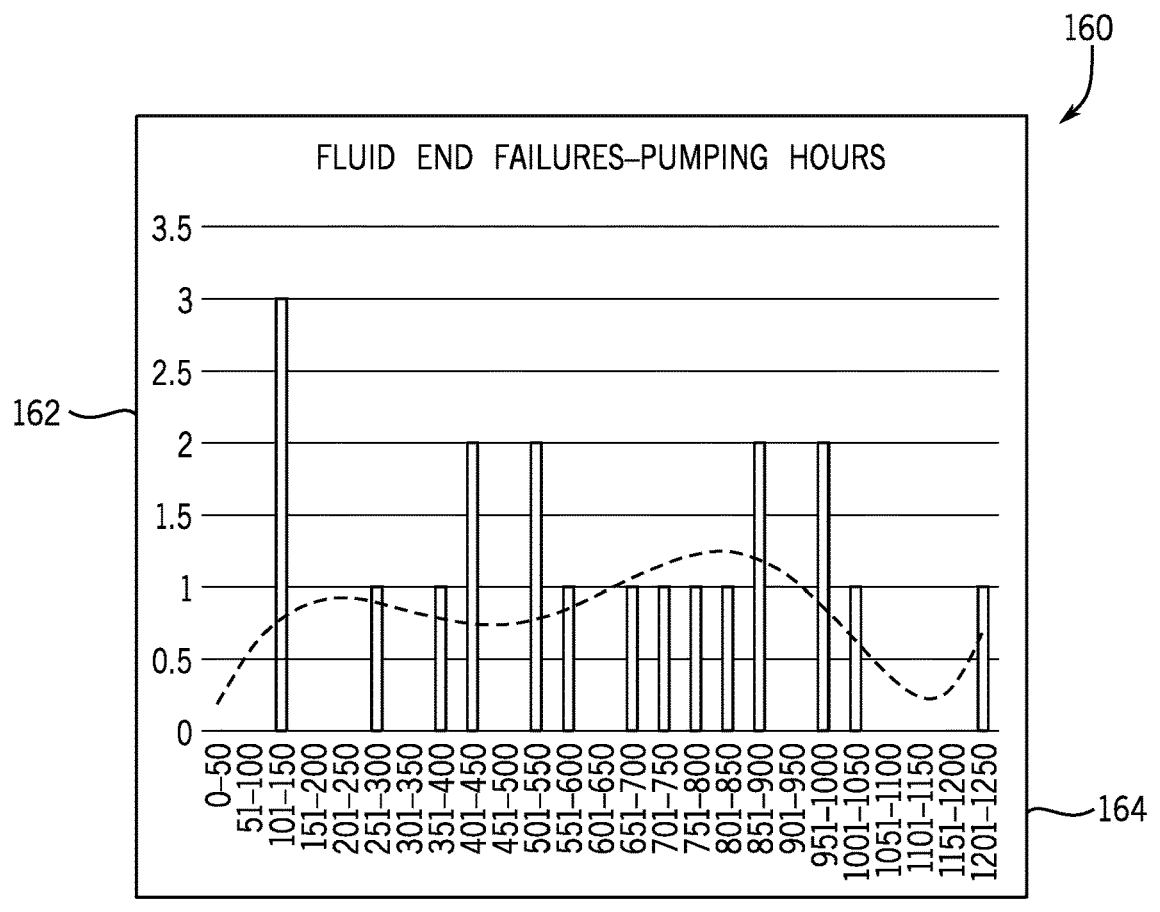
FIG. 4A illustrates fluid end failures based on pumping hours.
Figure 4B:
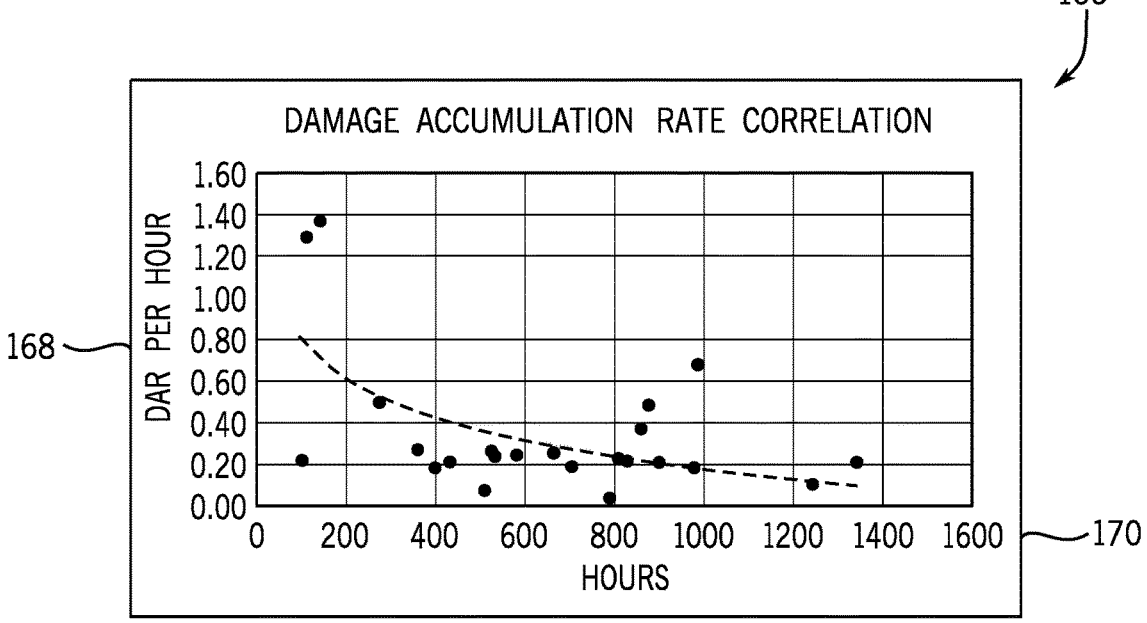
FIG. 4B illustrates fluid end failures based on number of months in operation.
Figure 4C:
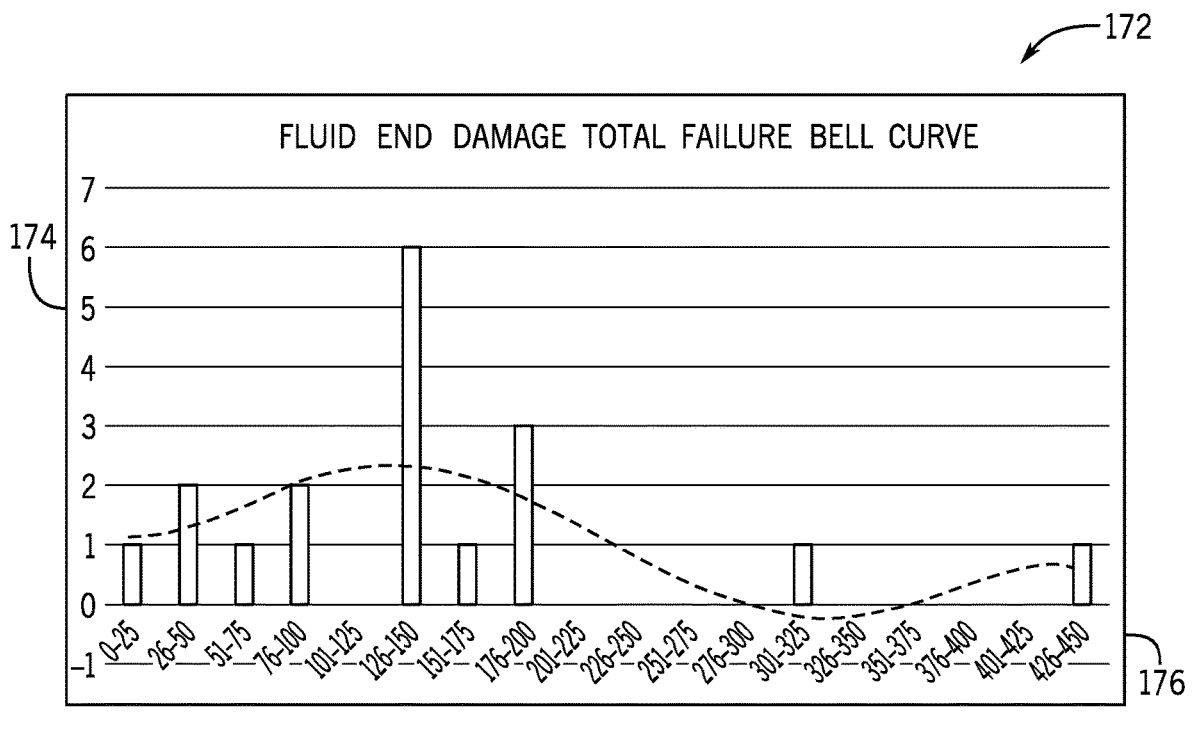
FIG. 4C illustrates fluid end failures based on a total damage accumulation metric, according to the techniques provided in the present disclosure.

FIGS. 4A-4C illustrate examples of three tracking methods, and it is clear that using damage accumulation total is an accurate way to better predict life expectancy for this piece of equipment. FIG. 4A is a plot 160 illustrating fluid end failures 162 based on pumping hours 164. As can be seen in chart FIG. 4A there is no common failure point based on pumping hours 164 alone. It ranges from 100 hours to 1,300 hours. This equates to months of pump time difference between the lowest and highest. Thus, this would not be an optimal metric on which to base machine health and life expectancy. FIG. 4B is a plot 166 illustrating fluid end failures 168 based on number of months 170 in operation, which is an example of a time-based interval. Similar to FIG. 4A, there is not a single column that provides us with the majority of the failures. Thus, this is also not an optimal way to manage and track equipment health.

Figure 4D:
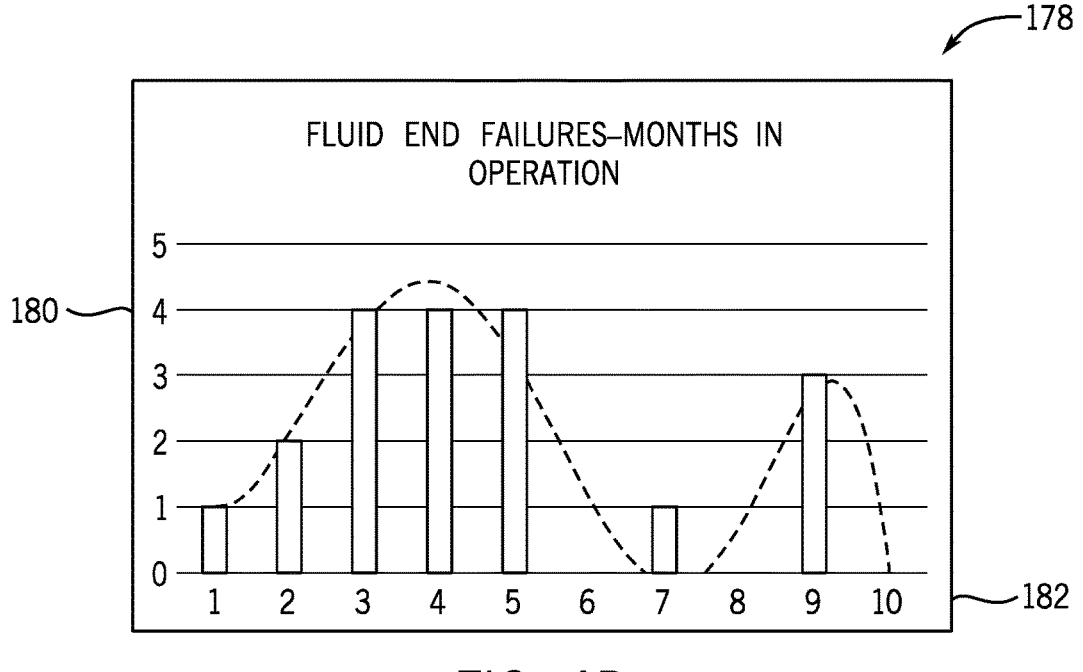
FIG. 4D illustrates a correlation between pumping hours and damage accumulation rates, in accordance with embodiments of the present disclosure.

FIG. 4C is a plot 172 illustrating fluid end failures 174 based on a total damage accumulation metric 176, according to the techniques provided in the present disclosure. FIG. 4C shows the new way to monitor, track, and manage equipment health. FIG. 4C shows a clearly defined zone of life expectancy. This can be used to generate the percent of remaining health based on historic and cumulative data. In this example, a large number of failures landed within the damage total range of 126-150 damage. Thus, the range of 126-200 has captured a true majority of failures (53%) in this case. These values may vary greatly in different cases, such as for different equipment, different observation frequency, and many other factors. Another observation using this method is that only 11% of units survived past this 200 damage mark. Another strong data point that could be used to indicate action need to be taken when this level is reached. A an example, FIG. 4D is a plot 178 illustrating a correlation between pumping hours 183 and damage accumulation rates 180, which shows that as pumps are ran at higher damage levels their fluid end life is directly correlated with shorter pumping hours.

An advantage of using damage accumulation totalizing is that it provides an accurate view of how much life has been consumed due to wear and tear from previous operating conditions. It then also will provide how much life is remaining. This remaining life percentage will adjust itself in real time based on current operating conditions. Example, if a unit has 25% remaining life and it is currently being ran at 2× normal damage, this 25% remaining will be cut in half if the unit continues to run at double the damage for the remainder of its life.

Figure 5:
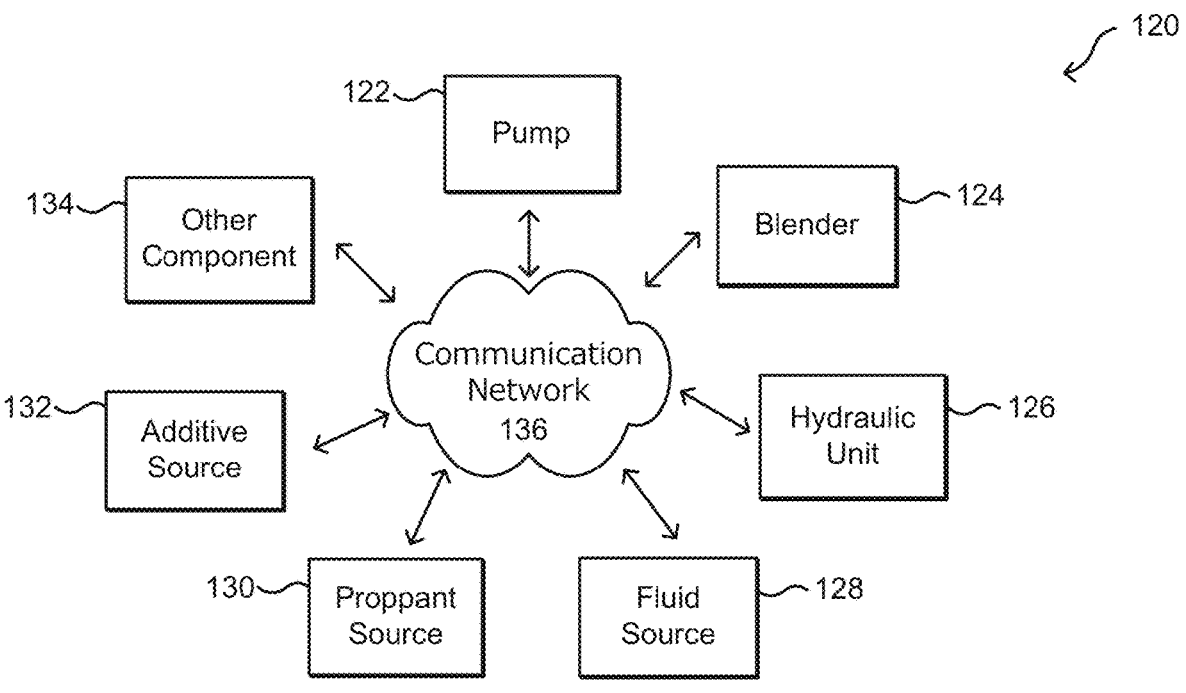
FIG. 5 is a diagram of communicative components of a hydraulic fracturing system with damage accumulation monitoring, in accordance with embodiments of the present disclosure.

FIG. 5 includes a diagram 120 illustrating a hydraulic fracturing system with damage accumulation monitoring, in accordance with various embodiments. Example equipment is illustrated, such as a pump 122, blender 124, hydration unit 126, fluid source 128, proppant source 130, additive source 132, and one or more other components 134, may include communication devices for transmitting and receiving data with each other over a communication network 136. The communication network 120 may include various types of wired or wireless communication protocols, or a combination of wired and wireless communications. In some embodiments, the connected automated fracturing system further includes one or more of a plurality of components including a manifold, a manifold trailer, a discharge piping, flow lines, conveyance devices, a turbine, a motor, a variable frequency drive, a generator, or a fuel source. Sensors may be integrated into the one or more of these components, any components described in this disclosure, and other components not described herein. The information obtained from these sensors may be used to determine damage accumulation at each individual component, or systems made up of a plurality of components.

Figure 6:
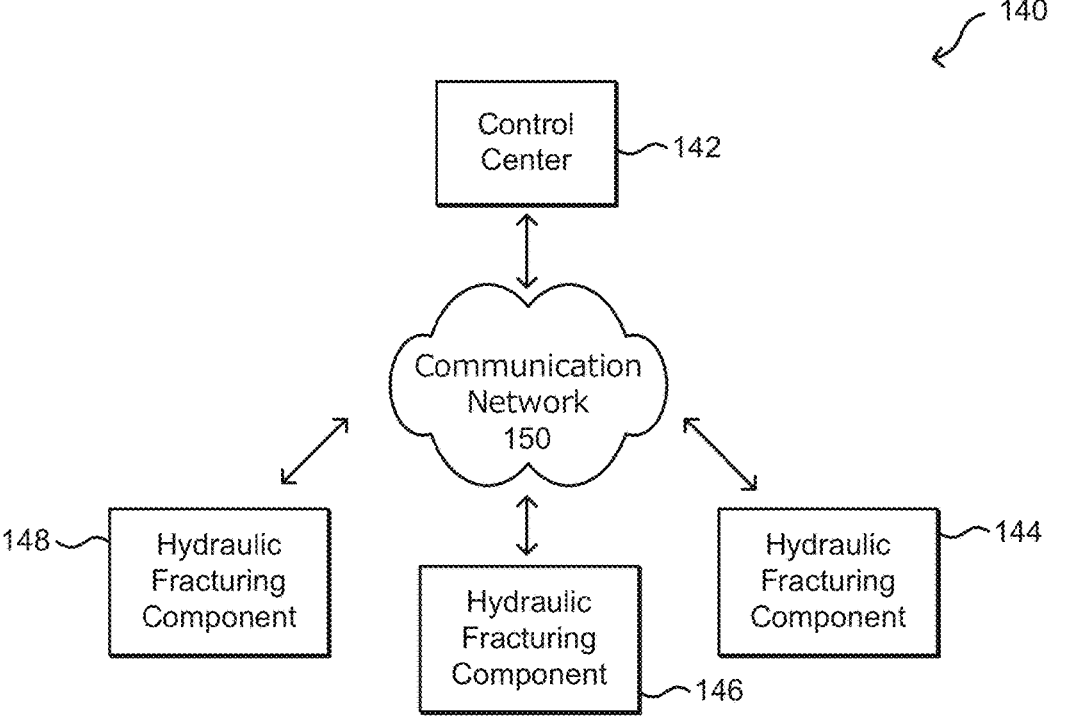
FIG. 6 is a diagram of communicative components of hydraulic fracturing system with damage accumulation monitoring, in accordance with embodiments of the present disclosure.

FIG. 6 includes a diagram 140 illustrating a communications network of the automated fracturing system, in accordance with various embodiments. In this example, one or more hydraulic fracturing components 148, such as, and not limited to, any of those mentioned above, may be communicative with each other via a communication network 150 such as described above. The components 148 may also be communicative with a control center 142 over the communication network 150. The control center 142 may be instrumented into the hydraulic fracturing system, in a data van, or located remotely. The control center 142 may receive data from any of the components 148, analyze the received data, and make various determinations regarding damage accumulation, useful life remaining, and maintenance schedules, as described herein. In some embodiments, the control center 142 may also include a user interface, including a display for displaying data and conditions of the hydraulic fracturing system. The user interface may also enable an operator to input control instructions for the components 144. The control center 142 may also transmit data to other locations and generate alerts and notification at the control center 150 or to be received at user device remote from the control center 142.

FIG. 7 is a flow diagram 200 illustrating a method of damage accumulation monitoring for a hydraulic fracturing system, in accordance with example embodiments. In this example, the method includes detecting (202) respective usage parameters associated with of a plurality of components of the plurality of pumps, the distribution system, or the wellhead via a plurality of sensing devices instrumented thereon, and determining (204) a damage accumulation parameter associated with of a plurality of components of the plurality of pumps, the distribution system, or the wellhead based at least in part on the respective usage parameters. In some embodiments, the accumulated damage parameter of a component is indicative of an amount of actual usage incurred by the component during a period of time. In some embodiments, the hydraulic fracturing method further comprises determining (206) an estimated remaining life of the component based on the accumulated damage parameter, wherein the estimated remaining life is expressed as a percentage. In some embodiments, the hydraulic fracturing method further comprises determining (208) a damage accumulation rate based on the accumulated damage parameter with respect to the duration of the period of time. In some embodiments, the hydraulic fracturing method further includes determining (210) an estimated maintenance time based on the damage accumulation rate and the accumulated damage parameter. In some embodiments, the hydraulic fracturing method further comprises updating (212) the damage accumulation rate over time.

Figure 8:
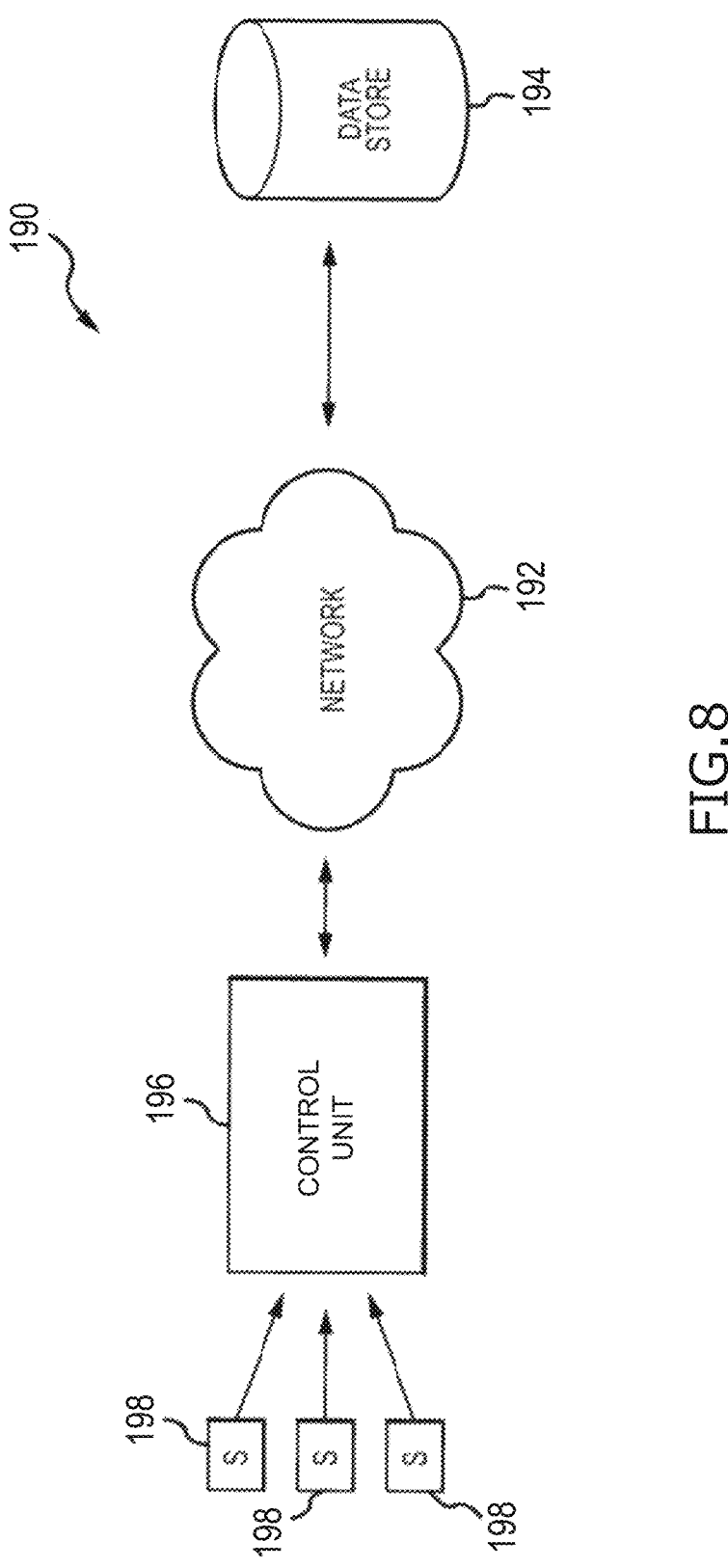
FIG. 8 is a block diagram of an embodiment of a control system of a hydraulic fracturing system with damage accumulation monitoring, in accordance with embodiments of the present disclosure.

FIG. 8 is a block diagram of an embodiment of a control system 190 for receiving, analyzing, and storing information from the well site. As described above, sensors 198 are arranged at the well site and may transmit data to a control unit 196 for evaluation and potential adjustments to operating parameters of equipment at the well site. The control unit 196 may be communicatively coupled to a network 192, such as the Internet, that can access a data store 194, such as a cloud storage server. Accordingly, in embodiments, data from the sensors 198 is transmitted to the control unit 196 (which may be located on a component, within a data van, or remotely) and is stored locally. However, the control unit 196 may upload the data from the sensors 198 along with other data, to the data store 194 via the network 192. Accordingly, data from previous pumping operations or different sensors may be utilized to determine damage accumulation of various aspects of the hydraulic fracturing operation as needed. For example, the flow data from the sensor 198 may be coupled with information from the sensors 198 (such as the vibration sensor, gear sensors, RPM sensors, pressure sensors, etc.) to provide diagnostics with information from the data store 194. For example, previous data may be used as training data for a machine learning model for predicting various parameters of a present operation.

In embodiments, the data store 194 includes information of the equipment used at the well site. It should be appreciated that, in various embodiments, information from the data store 194 may be stored in local storage, for example in storage within a data can, and as a result, communication over the network 192 to the remote data store 194 may not be used. For example, in various embodiments, drilling operations may be conducted at remote locations where Internet data transmission may be slow or unreliable. As a result, information from the data store 194 may be downloaded and stored locally at the data van before the operation, thereby providing access to the information for evaluation of operation conditions at the well site.

It should be appreciated that embodiments herein may utilize one or more values that may be experimentally determined or correlated to certain performance characteristics based on operating conditions under similar or different conditions. The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

The invention claimed is:

1. A system comprising:
   one or more components of a hydraulic fracturing system, wherein the hydraulic fracturing system is configured to pump a fracturing fluid into a wellhead;
   a damage accumulation monitoring system comprising a plurality of sensing devices and integrated into the one or more components;
   the plurality of sensing devices in communication with a monitoring unit to transmit damage accumulation data about a plurality of parameters of the hydraulic fracturing system, the damage accumulation data processed to determine a respective accumulated damage measurement of the one or more components;
   the plurality of sensing devices in communication with the monitoring unit to transmit estimated maintenance data about the plurality of parameters of the hydraulic fracturing system, the estimated maintenance data processed to determine an estimated maintenance time;
   the accumulated damage measurement processed to determine a percentage of life remaining of the one or more components; and
   a user interface configured to display the percentage to an operator, wherein the damage accumulation monitoring system further determines a damage accumulation rate based on the accumulated damage measurement with respect to a duration of a period of time, and wherein the damage accumulation monitoring system updates the damage accumulation rate over time.

2. The hydraulic fracturing system of claim 1, wherein the accumulated damage measurement of the one or more components is indicative of an amount of actual usage incurred by the one or more components during a period of time.

3. The hydraulic fracturing system of claim 2, wherein the damage accumulation monitoring system further determines the estimated maintenance time based on the damage accumulation rate and the accumulated damage measurement.

4. The hydraulic fracturing system of claim 1, wherein the damage accumulation measurement is based at least in part on one or more of a set of parameters including operation time, observed cycles, amount pumped, fuel consumed, power consumed, number of start/stops, or amount of flow.

5. A hydraulic fracturing system with damage accumulation monitoring, comprising:

a plurality of hydraulic fracturing equipment positioned at a wellsite, comprising: a plurality of pumps configured to pressurize a fracturing fluid;

a distribution system fluidly coupled to receive and consolidate fracturing fluid from the plurality of pumps for injection into a wellhead;

a damage accumulation monitoring system, comprising:

a plurality of sensing devices integrated into respective components of the plurality of hydraulic fracturing equipment;

the plurality of sensing devices in communication with a monitoring unit to transmit damage accumulation data about a plurality of usage parameters of the respective components;

a processing device configured to receive the plurality of usage parameters and determine a respective damage accumulation measurement of the respective components based at least in part on the usage parameters;

the processing device configured to determine a percentage of life remaining of the respective components based at least in part on the damage accumulation measurement, and configured to display, via a user interface, the percentage to an operator;

the plurality of sensing devices in communication with a monitoring unit to transmit estimated maintenance data about a plurality of usage parameters of the respective components; and the processing device configured to receive the plurality of usage parameters and determine a respective estimated maintenance time of the respective components based at least in part on the usage parameters, wherein the damage accumulation monitoring system further determines a damage accumulation rate based on the damage accumulation measurement with respect to a duration of a period of time, and wherein the damage accumulation monitoring system updates the damage accumulation rate over time.

6. The hydraulic fracturing system of claim 5, wherein the damage accumulation measurement of a component is indicative of an amount of actual usage incurred by the component during a period of time.

7. The hydraulic fracturing system of claim 6, wherein the estimated maintenance time is based on the damage accumulation rate and the damage accumulation measurement.

8. The hydraulic fracturing system of claim 5, wherein the usage parameters include one or more of a set of parameters including operation time, observed cycles, amount pumped, fuel consumed, power consumed, number of start/stops, or amount of flow.

9. A hydraulic fracturing method, comprising:

providing a fracturing fluid to a plurality of hydraulic fracturing pumps;

pumping the fracturing fluid into a distribution system;

injecting the fracturing fluid into a wellhead;

transmitting respective usage parameters associated with a plurality of components of the plurality of hydraulic fracturing pumps, the distribution system, or the wellhead, via a plurality of sensing devices instrumented thereon, to a processor;

determining, using the processor, a damage accumulation parameter associated with of a plurality of components of the plurality of hydraulic fracturing pumps, the distribution system, or the wellhead based at least in part on the respective usage parameters;

determining an estimated maintenance time based at least in part on the respective usage parameters;

determining a percentage of life remaining of the plurality of components based at least in part on the respective usage parameters; and displaying, via a user interface, the percentage to be viewable by an operator, wherein a damage accumulation monitoring system further determines a damage accumulation rate based on a damage accumulation measurement with respect to a duration of a period of time, and wherein the damage accumulation monitoring system updates the damage accumulation rate over time.

10. The hydraulic fracturing method of claim 9, wherein the damage accumulation parameter of a component is indicative of an amount of actual usage incurred by the component during a period of time.

11. The hydraulic fracturing method of claim 10, wherein the estimated maintenance time is based on the damage accumulation rate and the damage accumulation parameter.

\* \* \* \* \*